(12) United States Patent
Clarke et al.

(10) Patent No.: US 12,049,358 B2
(45) Date of Patent: Jul. 30, 2024

(54) STORAGE SYSTEMS AND METHODS

(71) Applicant: OCADO INNOVATION LIMITED, Herts (GB)

(72) Inventors: Paul Clarke, Herts (GB); Andrew John Ingram-Tedd, Herts (GB); Lars Sverker Ture Lindbo, Herts (GB)

(73) Assignee: OCADO INNOVATION LIMITED, Herts (GB)

( * ) Notice: Subject to any disclaimer, the term of this patent is extended or adjusted under 35 U.S.C. 154(b) by 0 days.

(21) Appl. No.: 18/063,856

(22) Filed: Dec. 9, 2022

(65) Prior Publication Data
US 2023/0108952 A1 Apr. 6, 2023

Related U.S. Application Data

(63) Continuation of application No. 17/174,020, filed on Feb. 11, 2021, now Pat. No. 11,554,914, which is a
(Continued)

(30) Foreign Application Priority Data

Oct. 19, 2016 (GB) ...................................... 1617727

(51) Int. Cl.
*B65G 1/04* (2006.01)
*B65G 57/03* (2006.01)
(Continued)

(52) U.S. Cl.
CPC ........... *B65G 1/0464* (2013.01); *B65G 57/03* (2013.01); *G06F 1/3203* (2013.01); *G06N 5/02* (2013.01); *H04W 4/80* (2018.02)

(58) Field of Classification Search
CPC ....... B65G 1/0464; B65G 57/03; H04W 4/80; G06F 1/3203; G06N 5/02
See application file for complete search history.

(56) References Cited

U.S. PATENT DOCUMENTS 2,701,065 A 2/1955 Bertel
5,473,908 A 12/1995 Saia et al.
(Continued)

FOREIGN PATENT DOCUMENTS

CN 103171850 A 6/2013
CN 103964110 A 8/2014
(Continued)

OTHER PUBLICATIONS

First Office Action issued on Feb. 2, 2021, by the Japanese Patent Office in corresponding Japanese Patent Application No. 2019-520953, and an English Translation of the Office Action. (14 pages).
(Continued)

*Primary Examiner* — Saul Rodriguez
*Assistant Examiner* — Ashley K Romano
(74) *Attorney, Agent, or Firm* — Buchanan Ingersoll & Rooney PC

(57) ABSTRACT

A storage system Includes a first set of parallel rails or tracks and a second set of parallel rails or tracks extending transverse to the first set in a substantially horizontal plane to form a grid pattern having a plurality of grid spaces. A plurality of stackable storage containers are arranged in stacks, the stacks of storage containers being located beneath the rails or tracks. Each stack is located within the footprint of a grid space. A load handling device is arranged to move laterally on the rails or tracks above the stacks of storage containers. The load handling device includes a lifting device arranged to lift storage containers from a top of a stack. The lifting device includes a cable to provide a service from a service source in the load handling device to the one or more storage containers.

19 Claims, 19 Drawing Sheets

Related U.S. Application Data continuation of application No. 16/343,124, filed as application No. PCT/EP2017/076799 on Oct. 19, 2017, now Pat. No. 10,919,699.

(51) Int. Cl.
  *G06F 1/32* (2019.01)
  *G06F 1/3203* (2019.01)
  *G06N 5/02* (2023.01)
  *H04W 4/80* (2018.01)

(56) References Cited

U.S. PATENT DOCUMENTS

| | | | |
|---|---|---|---|
| 5,602,721 | A | 2/1997 | Slade et al. |
| 6,654,662 | B1 | 11/2003 | Hognaland |
| 8,989,918 | B2 | 3/2015 | Sturm |
| 9,796,080 | B2 | 10/2017 | Ingram-Tedd et al. |
| 9,821,959 | B2 | 11/2017 | Hognaland |
| 10,196,209 | B2 | 2/2019 | Lindbo et al. |
| 10,556,742 | B2 | 2/2020 | Lindbo et al. |
| 11,337,323 | B2 * | 5/2022 | Zimmermann ..... G06F 13/4282 |
| 11,345,543 | B2 * | 5/2022 | Lindbo ................ B65G 1/0478 |
| 11,359,853 | B2 * | 6/2022 | Adetola ................ F25D 29/003 |
| 11,370,578 | B2 * | 6/2022 | Lindbo .................. B65D 19/06 |
| 11,377,309 | B2 * | 7/2022 | Ingram-Tedd ......... B65G 54/02 |
| 11,745,945 | B2 * | 9/2023 | Fjeldheim ............ B65G 1/0464 |
| | | | 414/281 |
| 2003/0156501 | A1 | 8/2003 | Spindel et al. |
| 2008/0075569 | A1 | 3/2008 | Benedict et al. |
| 2013/0166108 | A1 | 6/2013 | Sturm |
| 2013/0219060 | A1 | 8/2013 | Sturgeon et al. |
| 2013/0238795 | A1 | 9/2013 | Geffin et al. |
| 2013/0312450 | A1 | 11/2013 | Iwasa et al. |
| 2014/0191633 | A1 | 7/2014 | Zhu et al. |
| 2014/0279747 | A1 | 9/2014 | Strassner |
| 2014/0283452 | A1 | 9/2014 | Dittman et al. |
| 2015/0127143 | A1 | 5/2015 | Lindbo et al. |
| 2016/0129587 | A1 | 5/2016 | Lindbo et al. |
| 2016/0145058 | A1 | 5/2016 | Lindbo |
| 2016/0194151 | A1 | 7/2016 | Lindbo et al. |
| 2016/0325932 | A1 | 11/2016 | Hognaland |
| 2018/0035625 | A1 | 2/2018 | Lindbo et al. |
| 2018/0037411 | A1 | 2/2018 | Lindbo et al. |
| 2018/0043528 | A1 | 2/2018 | Lindbo et al. |
| 2018/0044110 | A1 | 2/2018 | Clarke et al. |
| 2018/0044111 | A1 | 2/2018 | Clarke et al. |
| 2018/0050869 | A1 | 2/2018 | Lindbo et al. |
| 2018/0051459 | A1 | 2/2018 | Clarke et al. |
| 2018/0086559 | A1 | 3/2018 | Lindbo et al. |
| 2018/0093828 | A1 | 4/2018 | Lindbo et al. |
| 2018/0237221 | A1 | 8/2018 | Lindbo et al. |
| 2019/0263589 | A1 | 8/2019 | Clarke et al. |
| 2020/0223629 | A1 | 7/2020 | Lindbo et al. |
| 2021/0171284 | A1 | 6/2021 | Clarke et al. |

FOREIGN PATENT DOCUMENTS

| | | |
|---|---|---|
| CN | 105899398 A | 8/2016 |
| EP | 0767113 A2 | 4/1997 |
| EP | 0767113 B1 | 7/2002 |
| EP | 1037828 B1 | 9/2003 |
| EP | 1627830 A1 | 2/2006 |
| EP | 2889233 A1 | 7/2015 |
| GB | 2520104 A | 5/2015 |
| GB | 2528573 A | 1/2016 |
| GB | 2529029 A | 2/2016 |
| GB | 2540651 A | 1/2017 |
| GB | 2540838 A | 2/2017 |
| GB | 2541055 A | 2/2017 |
| GB | 2541765 A | 3/2017 |
| GB | 2541766 A | 3/2017 |
| JP | H09511325 A | 11/1997 |
| JP | 2012056659 A | 3/2012 |
| JP | 2016525490 A | 8/2016 |
| NO | 317366 B1 | 10/2004 |
| WO | 9526888 A1 | 10/1995 |
| WO | 2006071227 A1 | 7/2006 |
| WO | 2009129900 A1 | 10/2009 |
| WO | 2014203126 A1 | 12/2014 |
| WO | 2015019055 A1 | 2/2015 |
| WO | 2015105426 A1 | 7/2015 |
| WO | 2016166308 A1 | 10/2016 |
| WO | 2016166354 A1 | 10/2016 |
| WO | 2017134033 A1 | 8/2017 |

OTHER PUBLICATIONS

International Search Report (PCT/ISA/210) with translation and Written Opinion (PCT/ISA/237) mailed on Feb. 2, 2018, by the European Patent Office as the International Searching Authority for International Application No. PCT/EP2017/076799.

Office Action (Examination Report No. 1) issued on Jun. 22, 2022, by the Australian Patent Office in corresponding Australian Patent Application No. 2017347684. (3 pages).

Office Action (Notice of Submission of Opinion) issued on May 17, 2022, by the Korean Patent Office in corresponding Korean Patent Application No. 10-2022-7004447, and an English Translation of the Office Action. (5 pages).

Office Action (Notification of Reason for Refusal) issued on Jun. 22, 2021, by the Korean Patent Office in corresponding Korean Patent Application No. 10-2019-7013853, and an English Translation of the Office Action. (18 pages).

"An Introduction to the AutoStore System", http://www.hatteland.com/files/jhc/AutoStore%20Concept%20Ver%2001.10a%20-%20Commercial.pdf. (36 pages).

Office Action (Communication of a Notice of Opposition) issued on Feb. 4, 2022, by the European Patent Office in corresponding European Patent Application No. 17790741.7. (33 pages).

Office Action (Examination Report No. 2) issued on Nov. 17, 2022, by the Australian Patent Office in corresponding Australian Patent Application No. 2017347684. (2 pages).

Office Action issued on Oct. 12, 2023, by the Canadian Patent Office in corresponding Canadian Patent Application No. 3,041,170. (4 pages).

First Office Action issued on Jan. 18, 2024, by the Chinese Patent Office in corresponding Chinese Patent Application No. 202110896575.6, and an English Translation of the Office Action. (11 pages).

* cited by examiner

STORAGE SYSTEMS AND METHODS

The present invention relates to storage systems. More specifically but not exclusively, it relates to a storage system having storage bins or containers in stacks and robots operating above the stacks to pick, move, remove, or replace containers.

This application claims priority from UK Patent Application No GB1617727.1 filed on 19 Oct. 2016, the entire content of which is hereby incorporated by reference.

This application relates to UK Patent Publication Nos. GB 2541766, GB 2540651, GB 2541055, GB 2541765, and GB 2540838 all filed 15 Apr. 2016 and having priority dates of 15 Apr. 2015, the content of all these applications hereby being incorporated by reference.

Some commercial and industrial activities require systems that enable the storage and retrieval of a large number of different products. One known type of system for the storage and retrieval of items in multiple product lines involves arranging storage containers or containers in stacks on top of one another, the stacks being arranged in rows. The storage containers or containers are accessed from above, removing the need for aisles between rows and allowing more containers to be stored in a given space.

In known storage and retrieval systems, the containers are passive and exist simply to hold the goods. Whilst the identity of a given container may be known and linked to its contents by barcoding for example, the containers in the system have no active components or on board intelligence.

In shipping container systems, the containers comprise monitoring and controlling systems to, for example, containers that chill the contents, containers that comprise gas monitoring systems, for example, to monitor for fruit ripening and containers that comprise locating means to enable individual containers to be tracked and traced in port.

Methods of handling containers stacked in columns and rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference.

FIGS. 3a and 3b are schematic perspective views of one form of a load handling device suitable for use in a robotic picking system from the rear and front, respectively, and FIG. 3c is a schematic front perspective view of the load handling device of FIGS. 3a and 3b lifting a bin or container.

A further development of load handling device is described in UK Patent Application No 1314313.6 (Ocado Innovation Ltd) where each robotic load handler only covers one grid space, thus allowing higher density of load handlers and thus higher throughput of a given size system.

In such known storage systems a large number of containers are stacked densely. The contents of the containers may degrade, may require lighting, heating or cooling, or may need some form of monitoring or control not currently provided by known systems.

According to the invention there is provided a storage system comprising: a first set of parallel rails or tracks and a second set of parallel rails or tracks extending transverse to the first set in a substantially horizontal plane the rails forming a grid pattern comprising a plurality of grid spaces; a plurality of storage containers arranged in stacks, located beneath the rails each stack being located within the footprint of a grid space and; at least one load handling device disposed on the grid, arranged to move laterally above the stacks on the rails, the load handling device comprising a lifting device arranged to lift one or more containers, or parts thereof, from a stack; wherein a number of the containers comprise service means for providing services to the or each container thereby enabling individual containers within the stacks to perform additional functions, the lifting device comprising releasably connecting means for connecting a load handling device to the container to be lifted, the electrically connecting means acting so as to maintain power, or data or signal or other services to the container when being lifted from a stack within the storage system.

According to the invention there is further provided a method of maintaining services to a container within a storage system, the method comprising the steps of positioning a load handling device above a container to be removed from the system, lowering lifting means from the load handling device, said lifting means comprising connecting means, releasably connecting to the container, lifting the container from the storage system, and maintaining the connection of power, or data or signal or other service to the container via the load handling device.

Advantageously, in accordance with one form of the invention, individual containers within the storage system may be provided with services, in addition to or in place of goods, yet may be removed from the system without loss of data or information stored within the container due to removal of power supplied via, for example the uprights of the storage system.

Furthermore, individual containers within the storage system may not contain goods but may contain services for provision to other containers or to monitor or control the condition of the system and in this way the integrity of the data contained therein is protected.

In this way, depending on the services provided in individual containers, the contents may be continually powered and data flow between containers maintained such that control or monitoring of containers within the system, or data relating to the system stored within memory or processing means within the system, is maintained.

Furthermore, services and conditions within the containers may be maintained, for example temperature, moisture, lighting or other parameters, as the power and data connections to the container are maintained by virtue of the electrical and or data connections to the load handling device lifting and carrying the container. Control functions may be provided either by a local control system in the bin or by a central system sending signals to actuators in the containers. Moreover, control and monitoring may be achieved for peer to peer communication via wireless or other means, between non-adjacent containers. The data transmitted may provide information on the condition of the bin, the contents of the bin or may provide information on adjacent containers to condition monitor the entire storage system. Furthermore, in this way, the containers may be heated or cooled as required by the specific contents of the bin. All of these services, data and control ability is maintained upon removal of the container from the stack for whatever reason.

In this way, the present invention overcomes the problems of the prior art and provides a system and method of increasing the reliability and reducing the overall cost of large bin handling storage systems in which the containers comprise services, memory means or processing means.

The invention will now be described with reference to the accompanying diagrammatic drawings in which:

FIG. 7a shows an expanded view of the connector means on the container of FIG. 5a;

Figure 16:
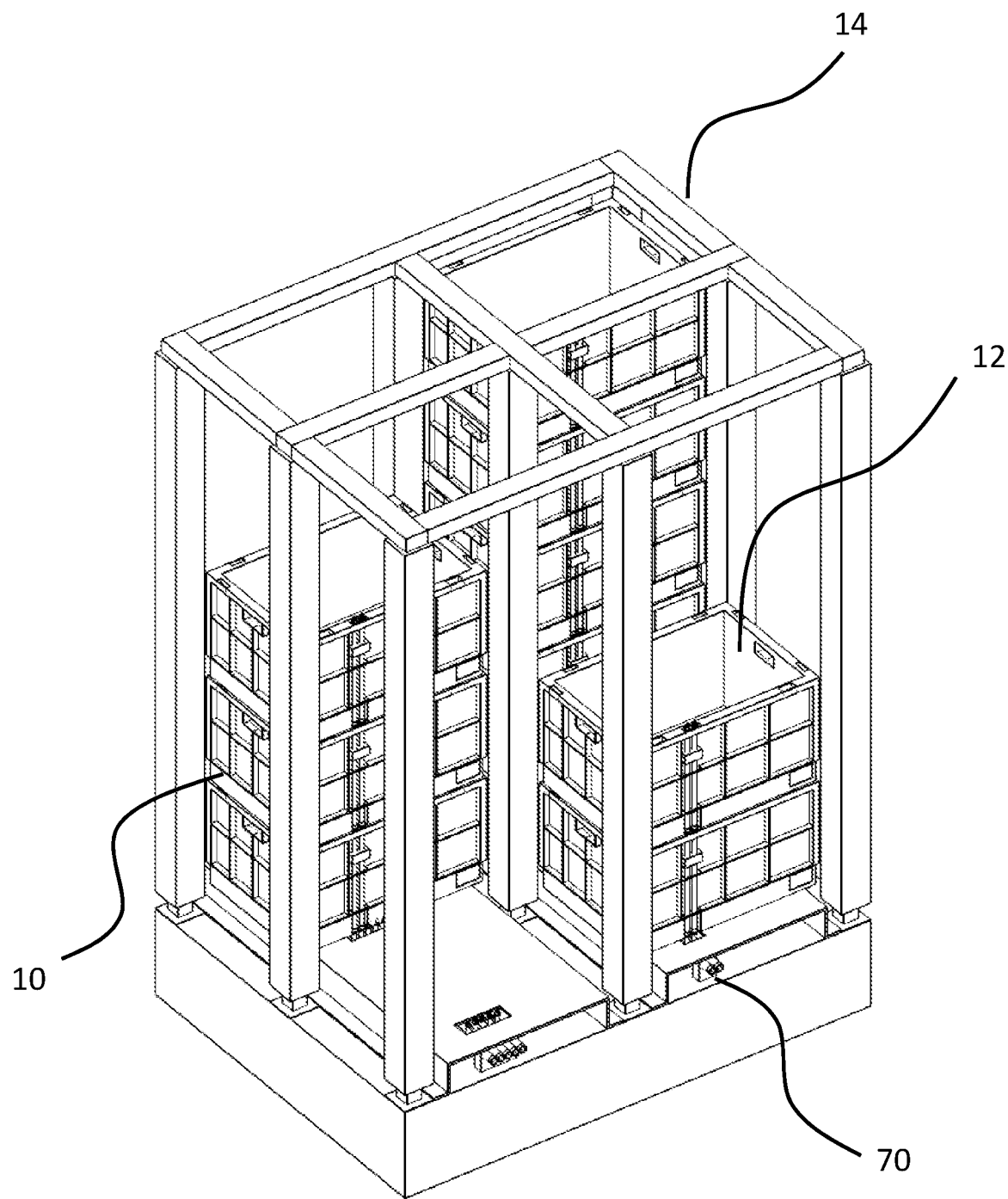
Figure 17:
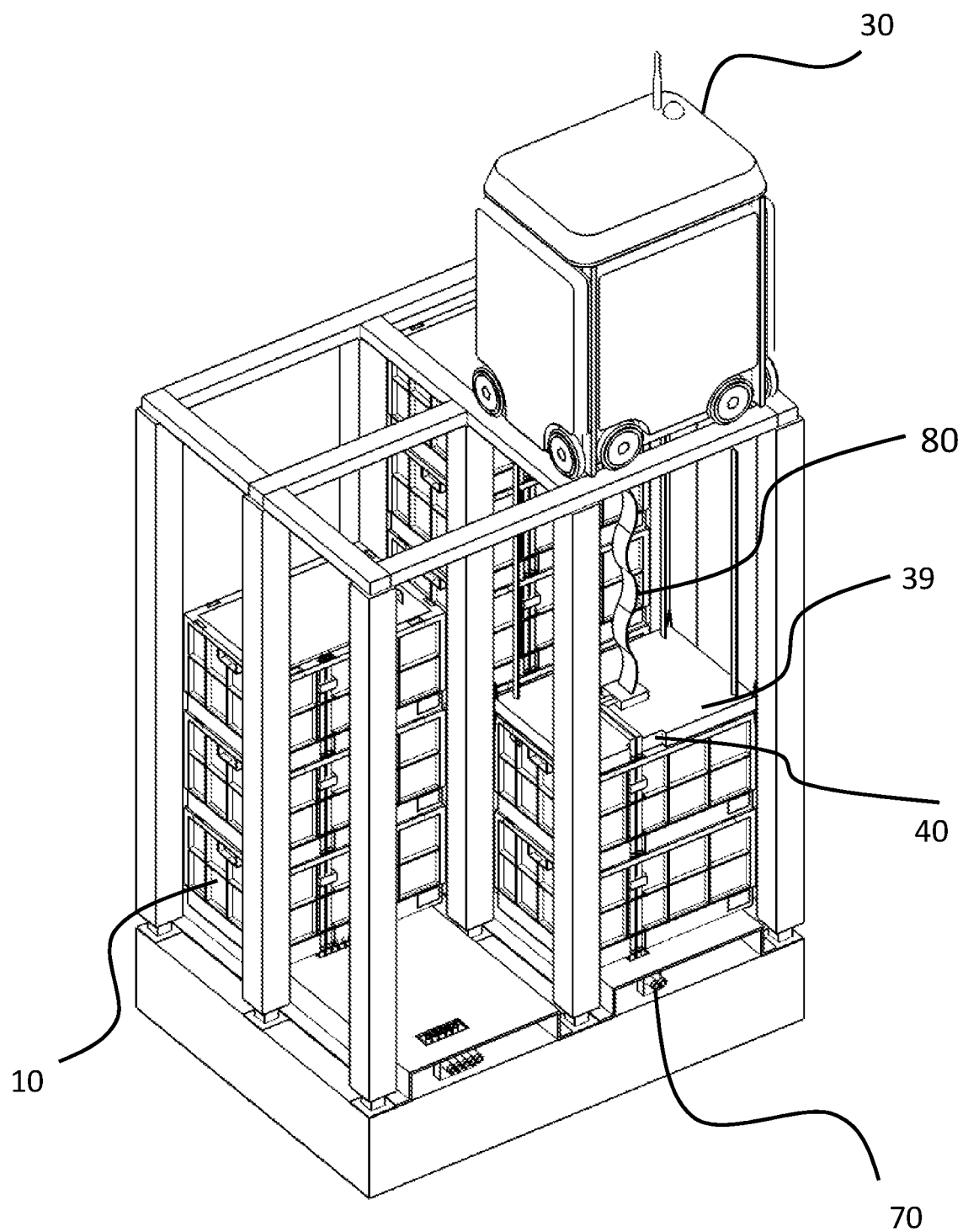
Figure 18:
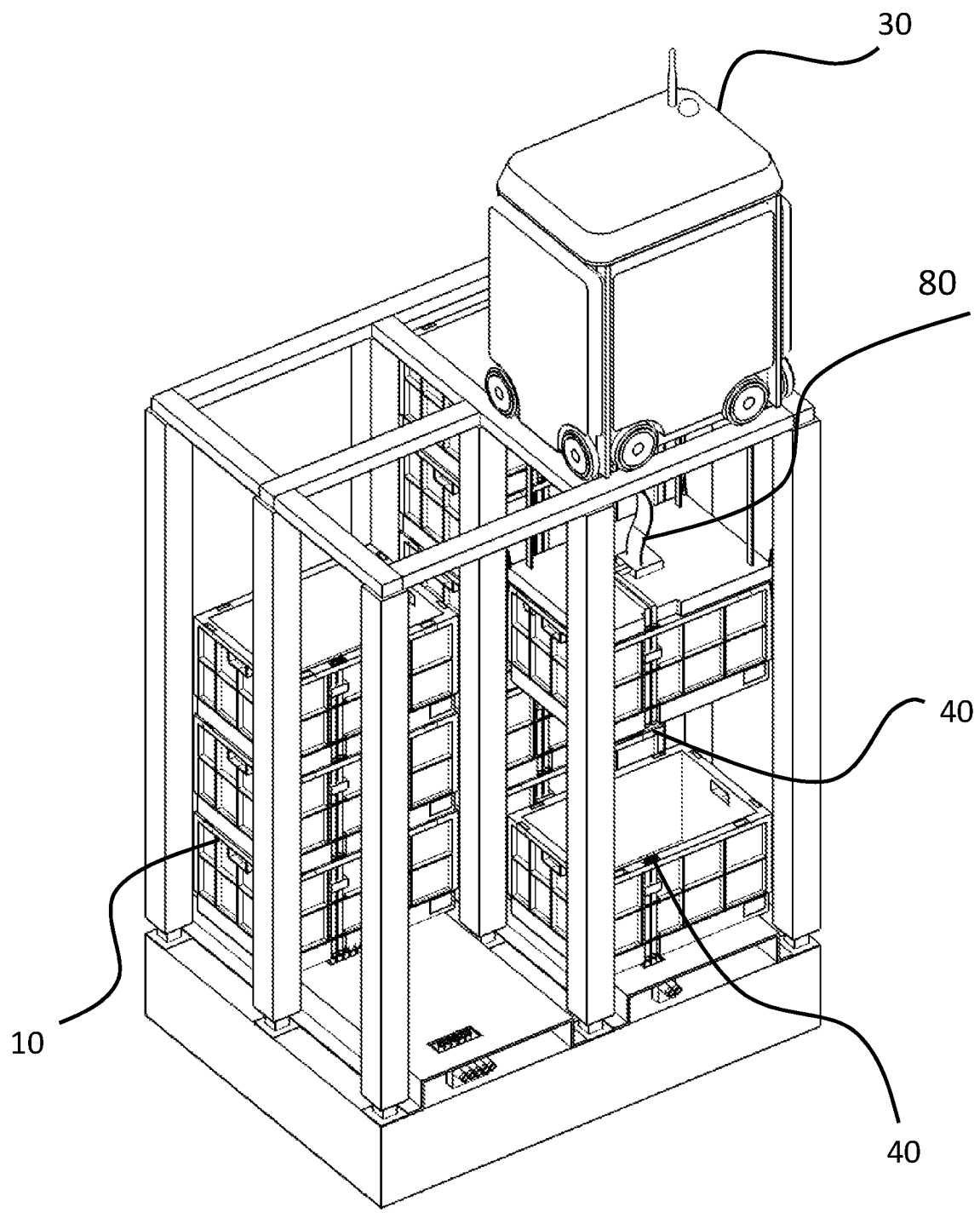

FIG. 16 is a schematic perspective view of a portion of the storage system showing a number of stackable containers in situation within the uprights of the storage system, each of the containers being electrically connected to the container immediately above and or below, the containers at the bottom of each stack being electrically connected to a power source located within the storage system, said connections between containers or between containers and the base of the system being releasable when the lifting device of the load handling device is connected;

FIG. 17 is a schematic perspective view of the portion of the system of FIG. 16, showing a lifting device in accordance with one form of the invention, the lifting device being in position and connected to the top most container of one of the stacks of containers within the storage system, power and/or signal connections being provided to the load handling device via a daisy-chain like cable; and FIG. 18 is a schematic perspective view of the portion of the system of FIGS. 16 and 17, showing a lifting device in accordance with one form of the invention, lifting a container from the stack of containers, the container being lifted, being electrically connected to the load handling device via a suitable cable.

Figure 1:
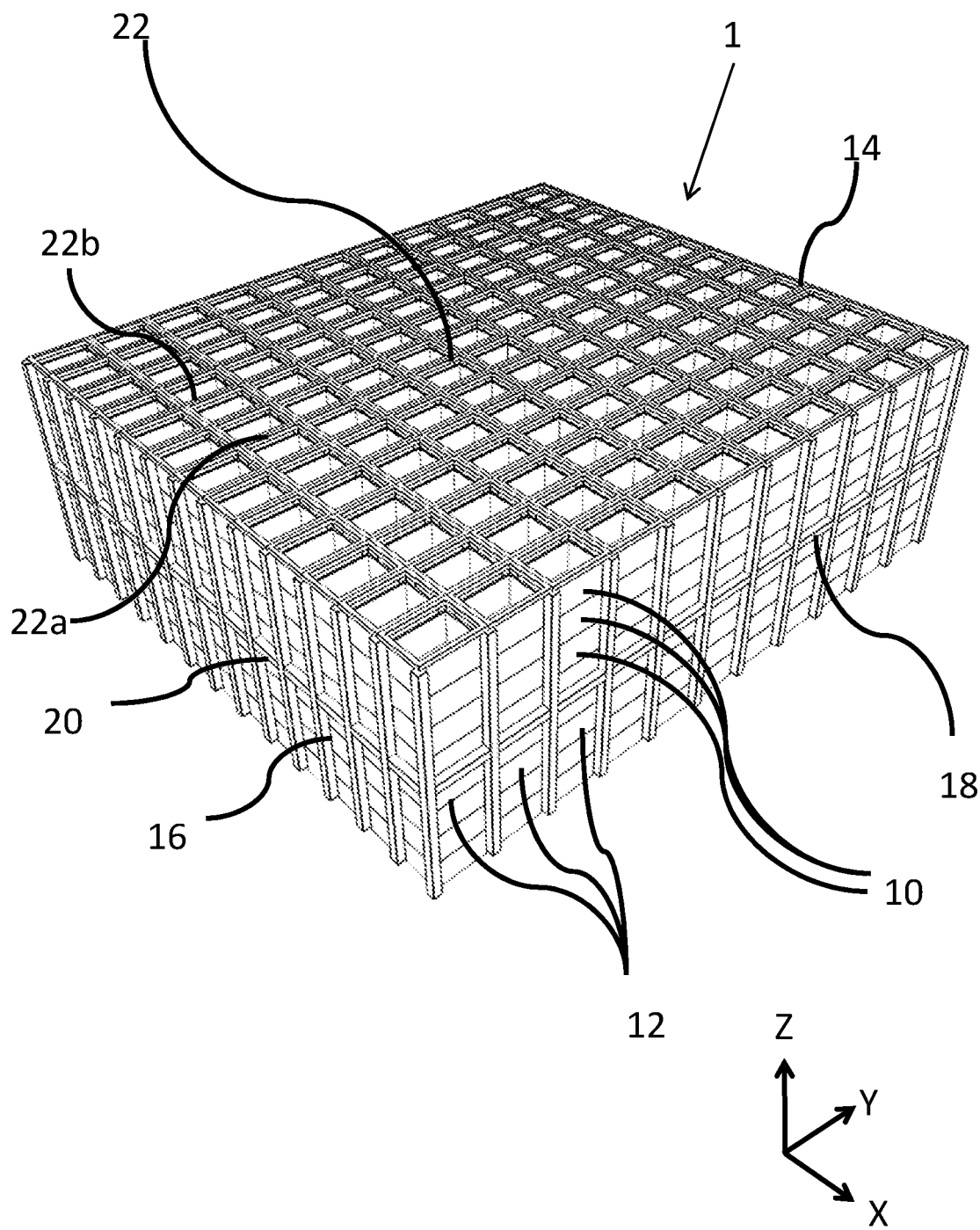
FIG. 1 is a schematic perspective view of a frame structure for housing a plurality of stacks of containers in a storage system.
Figure 2:
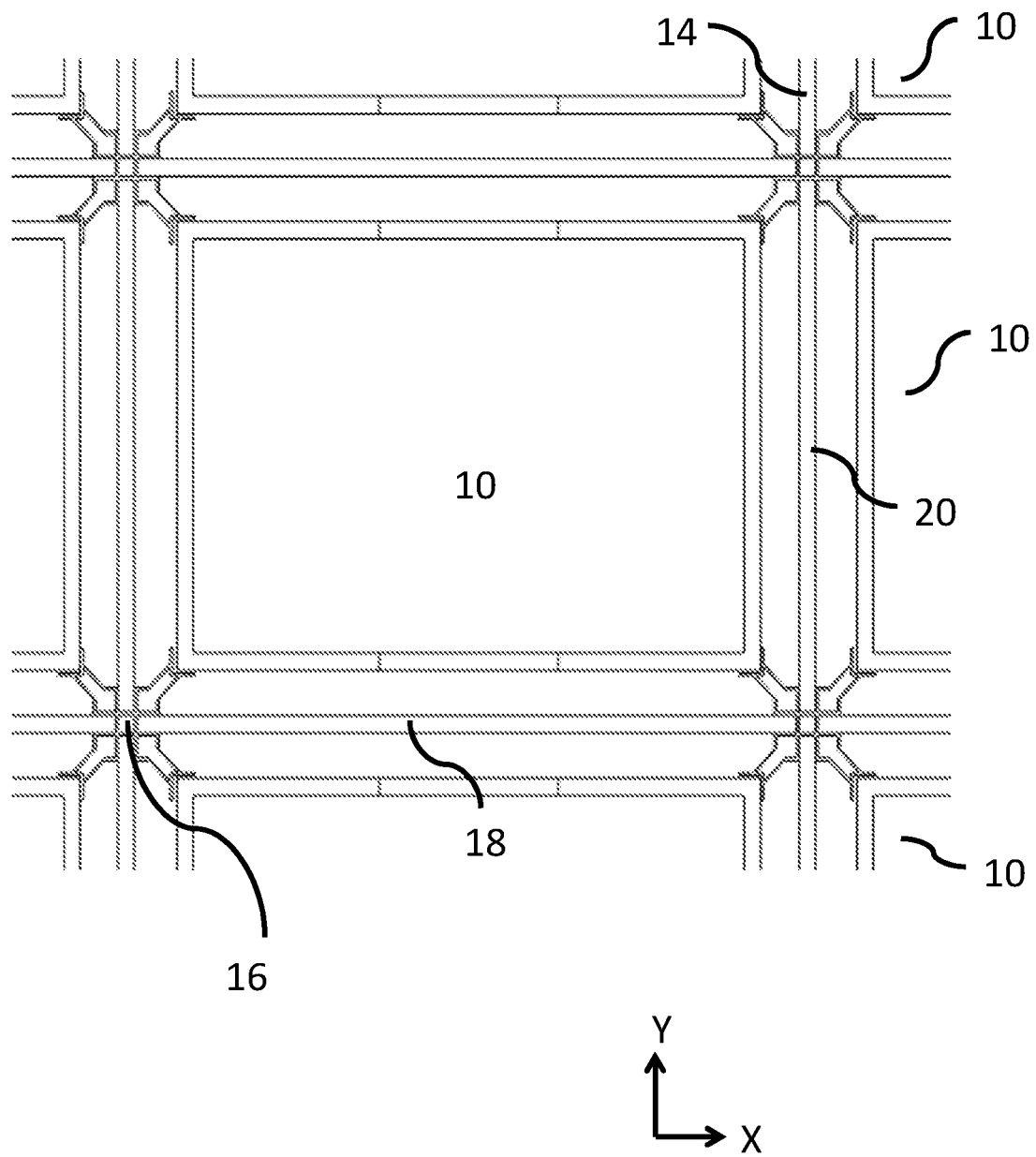
FIG. 2 is a schematic plan view of part of the frame structure of FIG. 1.
Figure 3A:
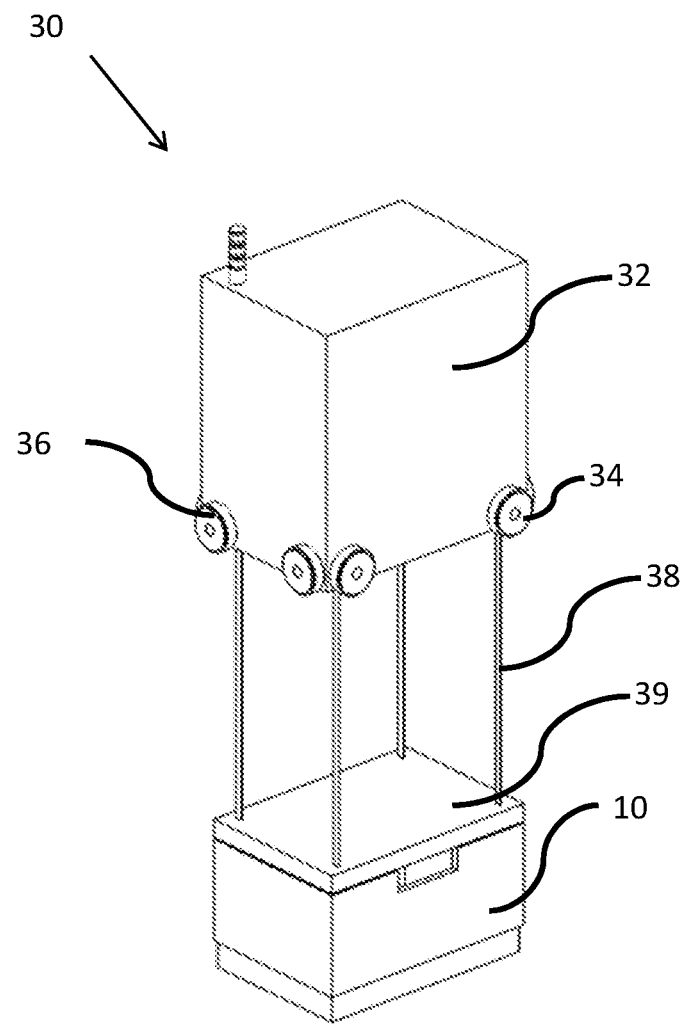
FIGS. 3a and 3b are schematic perspective views, from the rear and front respectively, of one form of robotic load handling device for use with the frame structure of FIGS. 1 and 2.
Figure 3B:
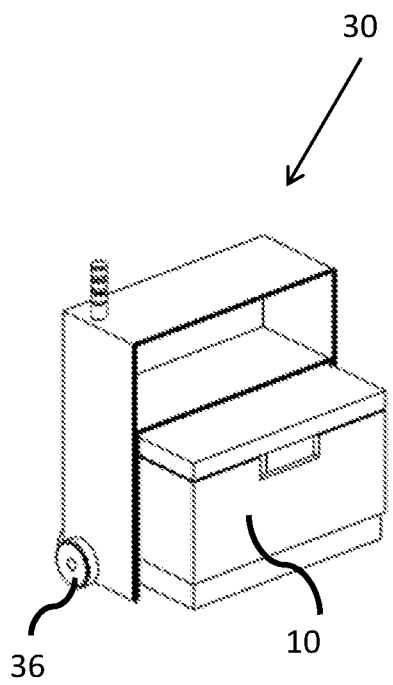
Figure 3C:
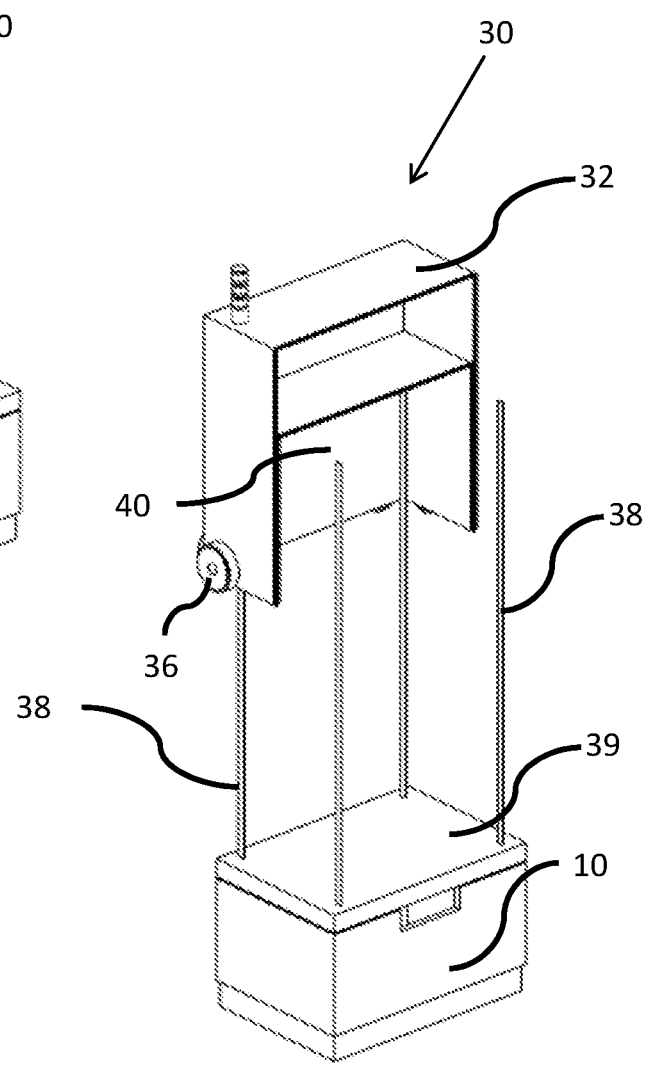
FIG. 3c is a schematic perspective view of the known load handler device in use lifting a bin.

As shown in FIGS. 1 and 2, stackable containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items or good (not shown), and the product items within a bin 10 may be identical, or may be of different product types depending on the application.

The frame structure 14 comprises a plurality of upright members 16 that support substantially horizontal members 18, 20. A first set of substantially parallel substantially horizontal members 18 is arranged perpendicularly to a second set of substantially parallel substantially horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3a-3c and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack 12 to access the required products. In this way, multiple products can be accessed from multiple locations in the grid and stacks at any one time.

It will be appreciated that if the required container 10 is not at the top of the stack 12, if each load handling device can only carry a single container 10 then multiple load handling devices will need to co-operate in order to access the target container 10.

Figure 4:
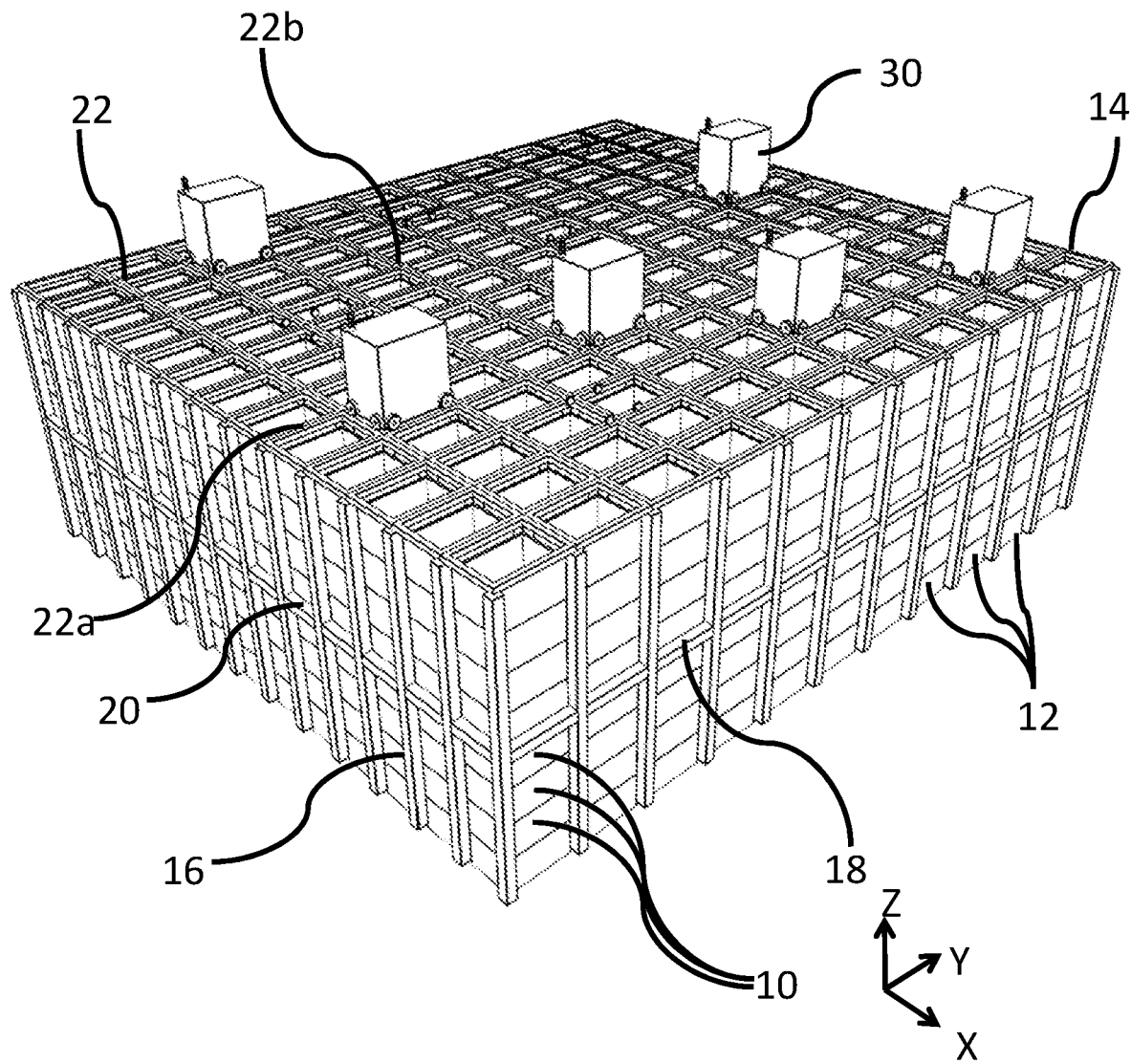
FIG. 4 is a schematic perspective view of a known storage system comprising a plurality of load handler devices of the type shown in FIGS. 3a, 3b and 3c, installed on the frame structure of FIGS. 1 and 2, together with a robotic service device in accordance with one form of the invention.

FIG. 4 shows a typical storage system as described above, the system having a plurality of load handling devices 30 active on the stacks 12 in order to co-operate to retrieve and replace containers 10 from and to the stacks 12. Unwanted containers 10 removed from stacks 12 in the pursuit of a target container 10 are placed back in to the stacks 12 at vacant positions.

FIGS. 1 and 4 show the bins 10 in stacks 12 within the storage system. It will be appreciated that there may be a large number of bins or containers in any given storage system and that many different goods may be stored within the bins or containers in the stacks 12, each bin or container may contain different goods within a single stack 12 or similar goods may be stored in bins or containers 10 in a given stack or multiple different inventory items or goods may be stored in an individual container 10. Whilst the above described system was conceived to store and retrieve groceries in an online shopping e-commerce solution, it will be appreciated that other uses are envisaged and that other items such as parcels and letters may be stored in the containers 10.

Preferably in a first embodiment of the invention, the bins or containers comprise memory or processing means or the like. It will be appreciated that all of the bins or containers may comprise memory or processing means. Alternatively only a portion of the bins or containers may comprise memory or processing means. It will be appreciated that memory or processing means may comprise computer means or any other means suitable for performing mathematical or computational functions.

Figure 5A:
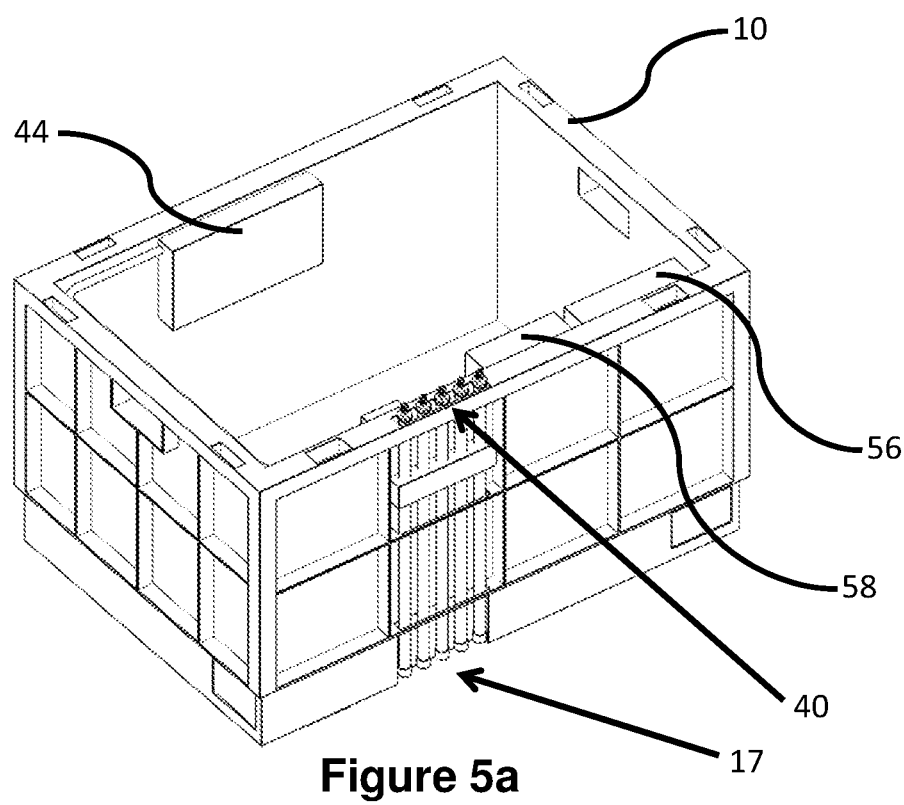
FIGS. 5a and 5b are schematic perspective views of one form of container, FIG. 5a showing a view of one side and FIG. 5b showing the opposite side view of the same container, the container comprising services and utilities connected via connection means, the connection means being supplied via routing means located on at least one side of the container.
Figure 5B:
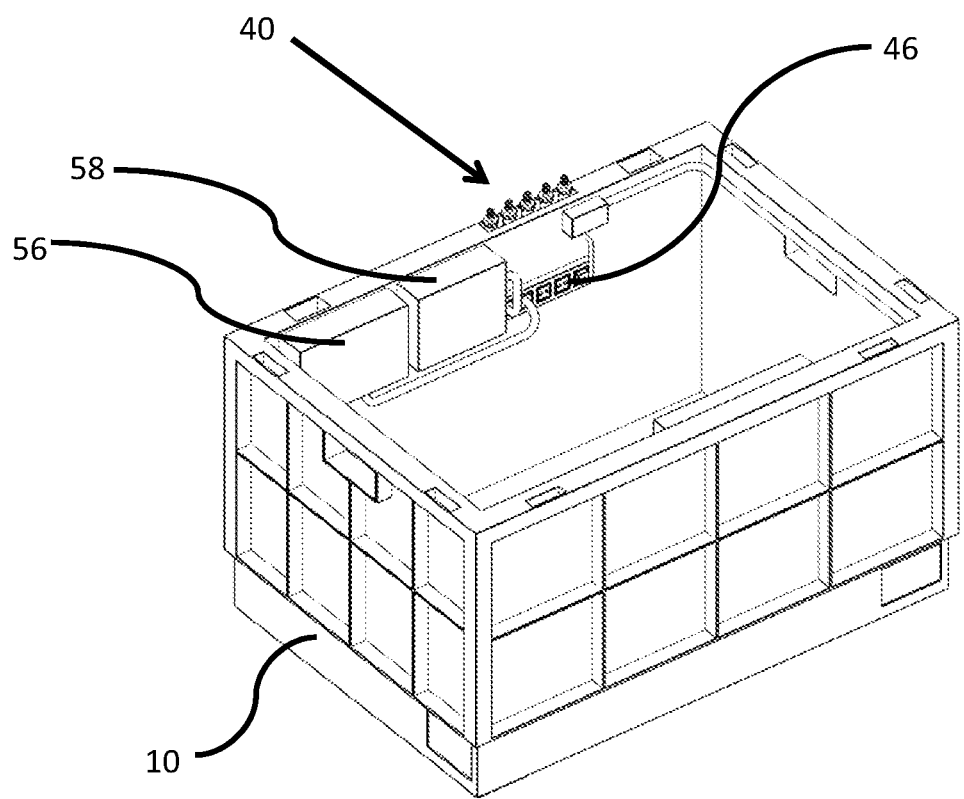

FIGS. 5a and 5b show one form of suitable container, the container 10, being capable of being held in stacks by co-operating surfaces forming interference fits between adjacent containers 10. The container 10 of FIGS. 5a and 5b, additionally comprises connection means 40 at the co-operating surface where containers will cooperate in order to form a stack 12 of containers 10. The connection means 40 shown in FIGS. 5a and 5b comprises a push fit male connector 40 located at the top edge of the container 10. The bottom edge of the container comprises a female connector. The two containers are linked by routing means that may form part of the container 10 as mouldings or may be pipes, cables, wires or other routing means mounted on the surface of the side of the container 10. It will be appreciated that this form of connector means and routing means is one form only of connector and routing means that may be used, any suitable form of releasable connector means capable of latching or connecting and unlatching or disconnecting as required on movement of the container in or out of the stack 12.

For example, the connection means 40 may comprise electrically conductive layers deposited on the co-operating surfaces of the containers 10 or may comprise sprung-loaded contacts or springs as contacts or any other connection means capable of carrying power, data or other signals between two or more containers 10. Non-contacting methods of power transmission may also be used, for example magnetic induction or RF induction and optical methods. Furthermore, the connection means 40 may comprise carbon loaded rubber contacts capable of carrying signals or data between two or more co-operating containers 10 in a stack.

Whilst the containers may be held in stacks 12 by interference means or by adjacent containers 10 having shaped, co-operating surfaces, containers 10 may be latched together via suitable latching means (not shown). The latching means may act to releasably latch two or more containers 10 together in the stack 12. The latching means must be capable of remote operation in order that the load handling means may lift individual containers 10 or a plurality of containers 10 latched together. Any form of remotely latching and unlatching means may be used. For example electromagnetic latching means or any other means suitable to perform the function.

Figure 6A:
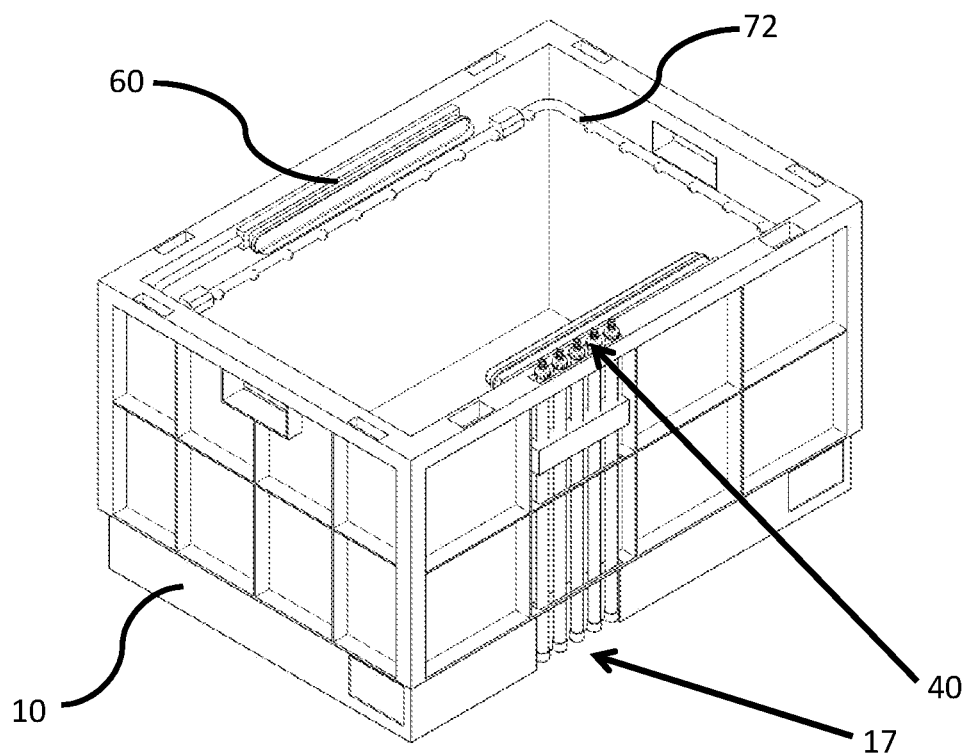
FIGS. 6a and 6b are schematic perspective views of another form of container, the container comprising lighting means and fluid supply means.
Figure 6B:
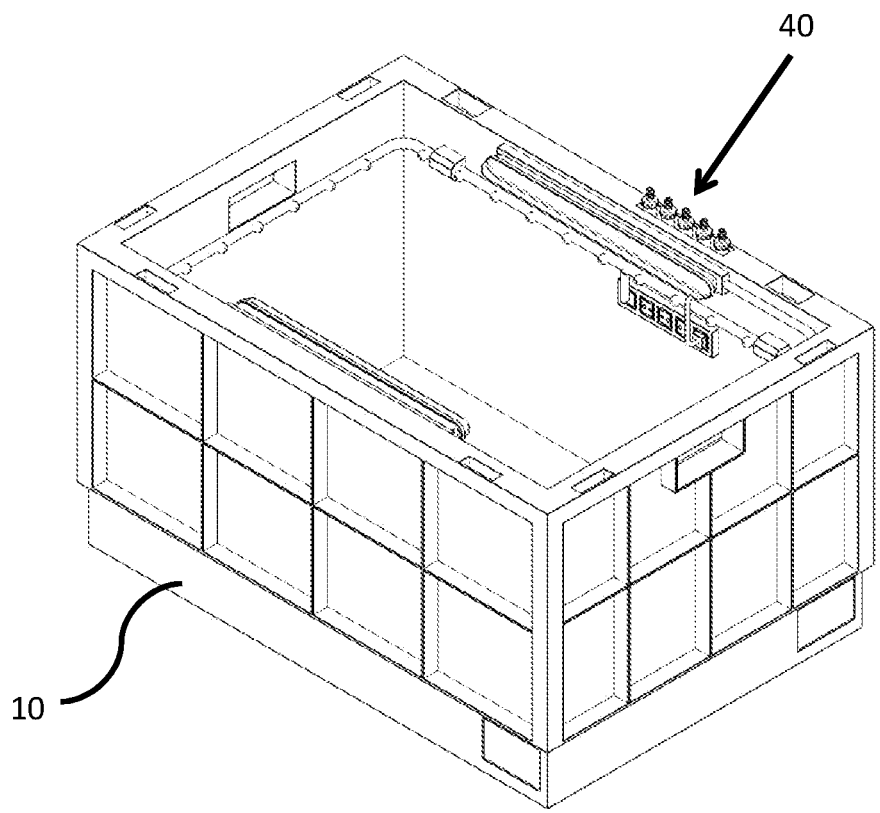

FIGS. 5a and 5b further show an individual bin 10 comprising power supply means 42 for supplying power to, for example, heating means 56, cooling means 58, data logging means 44, communication means 46 and/or lighting means 60 in FIGS. 6a and 6b. The bin 10 further comprises power control means 43 for controlling the power to the or each service and controlling the power to other containers 10 in the stack 12, if power is to be transmitted to adjacent containers 10 in the stack 12. It will be appreciated that containers 10 comprising power control and control means may power heaters 56, coolers 58, lights 60 or any other service requiring power. Anything requiring power may utilise the power supply means 42. The power supply means may comprise batteries or may comprise means for transmitting power from an external power source through connection means 52 on the containers 10 from the base of the storage system or via the uprights 16 of the grid.

Furthermore, power, data or any other signals may be supplied to the containers 10 in the stacks 12 via power and or data connectors located in the floor of the warehouse. Power may be transmitted up the stacks 12 via the contacts 52 in the co-operating surfaces of the containers 10. Moreover, services may flow up stacks 12 of containers 10 from the floor, for example cooling or heating fluids may be utilised in this manner.

FIGS. 5a and 5b further show an individual bin 10 comprising at least data logging means 44 and communication means 46 for transmitting data recorded to a remote central data logging device. The data logging means 44 comprises sensors suitable for monitoring the conditions in the bin 10, for example the temperature, any gas emission, for example as a result of decomposing fruit, and humidity. The data logging means 44 and communicating means 46 enable the content and condition of individual containers 10 to be monitored.

Furthermore, knowing information about specific containers 10 in the stacks 12 in the system enables the condition of the storage system as a whole to be monitored. Whilst the bins or containers 10 per se may be anonymous, a unique identity may be assigned to each bin or container 10 in the storage system. In this way, the location of each bin or container 10 (and by association its contents) may be trackable and identifiable by the system via the communications means. In this way, the topology of the bins or containers 10 can be constructed as a result of each bin or container 10 having knowledge of the identity of the immediately adjacent bins or containers 10 and the bottom bin or container 10 in any stack having knowledge that there are no containers 10 below.

It will be appreciated that any type and method of communication may be used, for example WiFi, Bluetooth, 3-wire serial, SigFox or other proprietary systems such as that described in UK Patent Application No. GB1509793.4 to Ocado Innovation Limited, the contents of which in hereby incorporated by reference. It will be appreciated that any other suitable communications means or protocol may be used.

FIGS. 5a and 5b further show an individual container 10 from the stack 12, the container 10 comprising heating 56 and/or cooling means 58 and temperature monitoring means 50 for monitoring the temperature in the bin 10. The heating means 56 may comprise flow of hot fluid via direct means, for example hot air, or indirect means, for example radiator means or may further comprise electrical heaters or electromagnetic induction heaters.

The cooling means 58 may comprise Peltier coolers or may comprise flow of cold fluid via direct means, for example cold air or via indirect means, for example radiator means, including ice slurry compressor driven.

In these ways, the temperatures of individual containers 10 may be monitored, controlled and varied depending on the content of the individual bin 10. If the contents of the bin need to be chilled or frozen, then the individual bin can have a temperature of 5 degrees C. maintained, for chilled, and lower for frozen, rather than requiring a portion of the stacks 12 in the storage system to be maintained at a predetermined temperature by space heaters and coolers.

It will be appreciated that these are examples only and any suitable form of heater or chiller may be used to achieve the desired effect. The bins or containers 10 may be designed and arranged such that each bin or container 10 is sealed, for example in an airtight fashion, by the bin or container 10 located above. The top bin or container 10 in each stack 12 may be provided with a lid, not shown, to seal the top bin or container 10. Sealing the bins or containers 10 in this fashion enables the temperature within an individual bin or container to be more easily controlled by suitable heating or cooling means.

FIGS. 6a and 6b show an alternative form of the bin or container 10 comprising lighting means 60 and fluid supply means 72. The same connectors 40 and 17 may be used to route power to the lighting means 60 or water, for example to the fluid supply means 72.

Figure 7A:
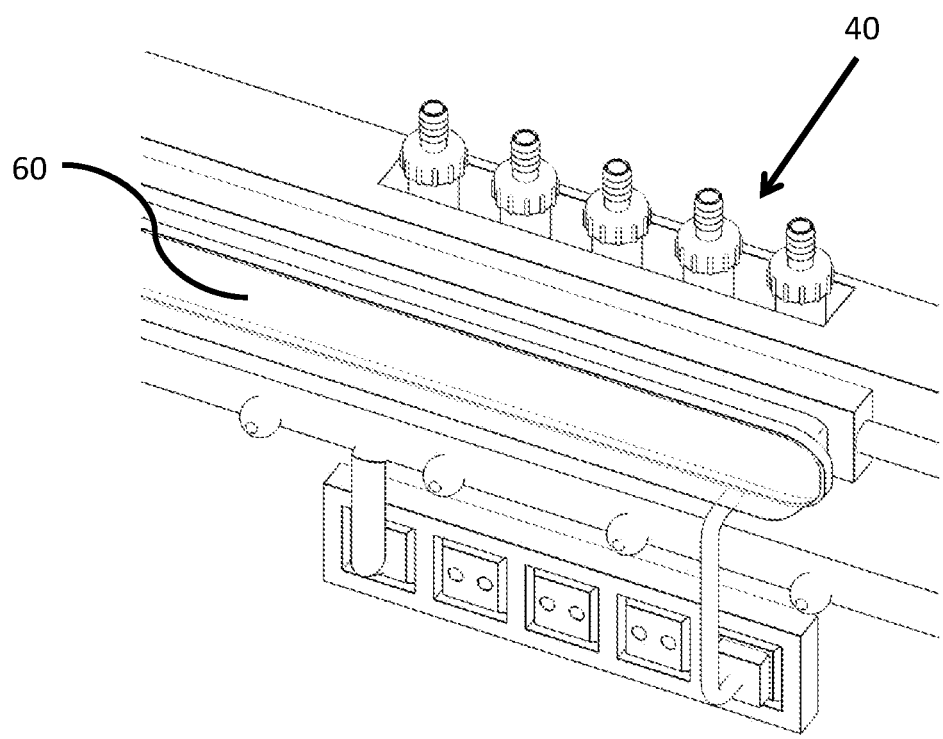
Figure 7B:
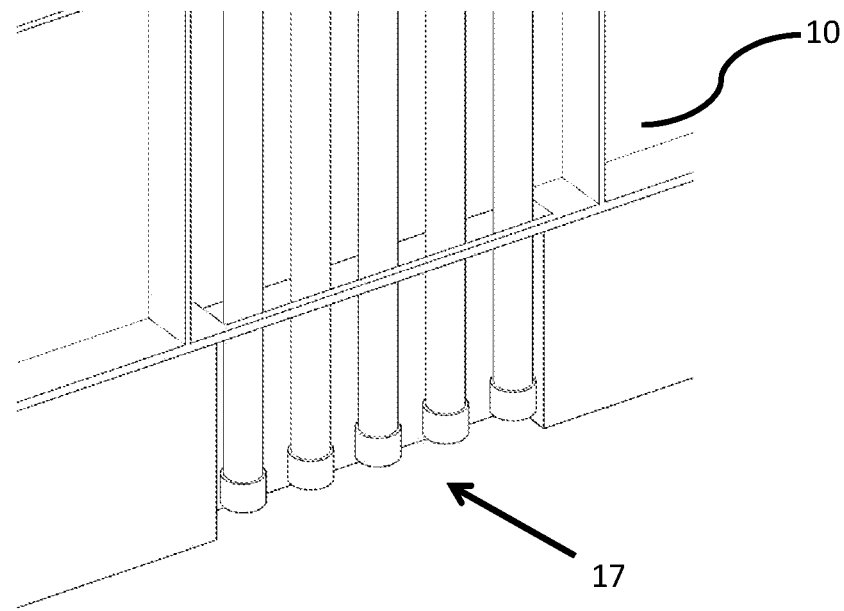
FIG. 7b shows an expanded view of the routing means on the container of FIG. 5b.

FIGS. 7a and 7b show and expanded view of the male connector 40 and the female connector 17 located on or in the side of the bin or container 10. FIGS. 7a and 7b show one example only of the connection means that may form the connections between adjacent bins or containers 10 in a stack 12 of containers 10 in detail.

Figure 8A:
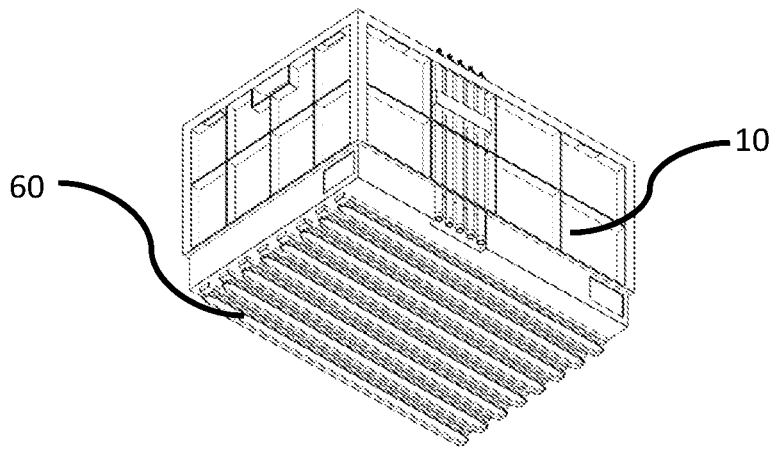
FIGS. 8a, 8b and 8c are schematic perspective views of a container, the container comprising lighting means in the container or a part thereof.
Figure 8B:
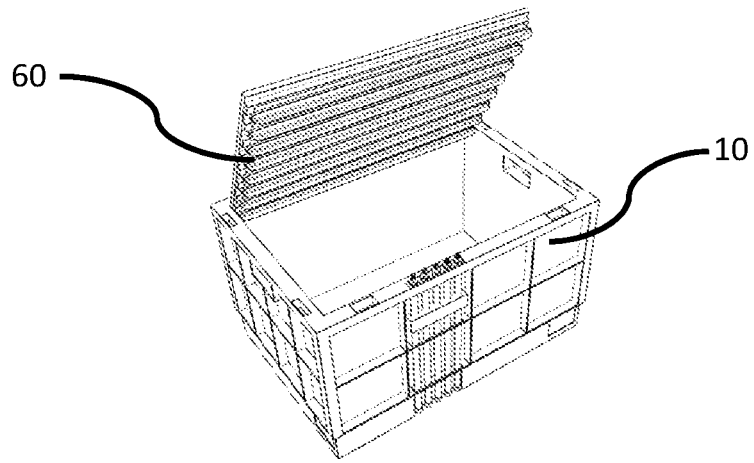
Figure 8C:
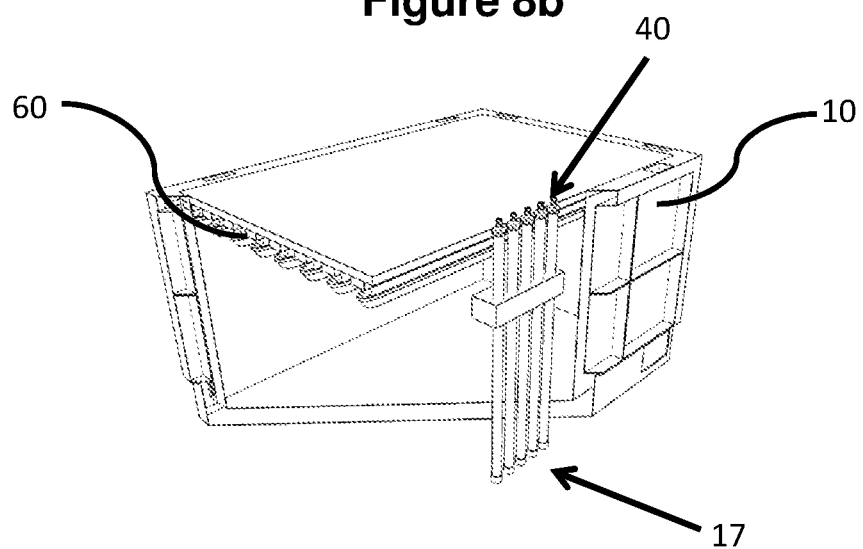

FIGS. 8a-8c show three examples of an individual bin or container 10 from the stack 12, the bin or container 10 comprising lighting means. The lighting means 60 may be provided in the base of a bin to light the bin 10 below. Alternatively the lighting means 60 may comprise a lid 62 containing suitable bulbs, LEDs or any other suitable form of lighting. The lid 62 may be removeably attached to the bin 10 and fold away during removal of the bin 10 from the stack 12. Again the power supply to the lighting means 60 is supplied via the connector means 40 and 17 located on the container 10.

Figure 9:
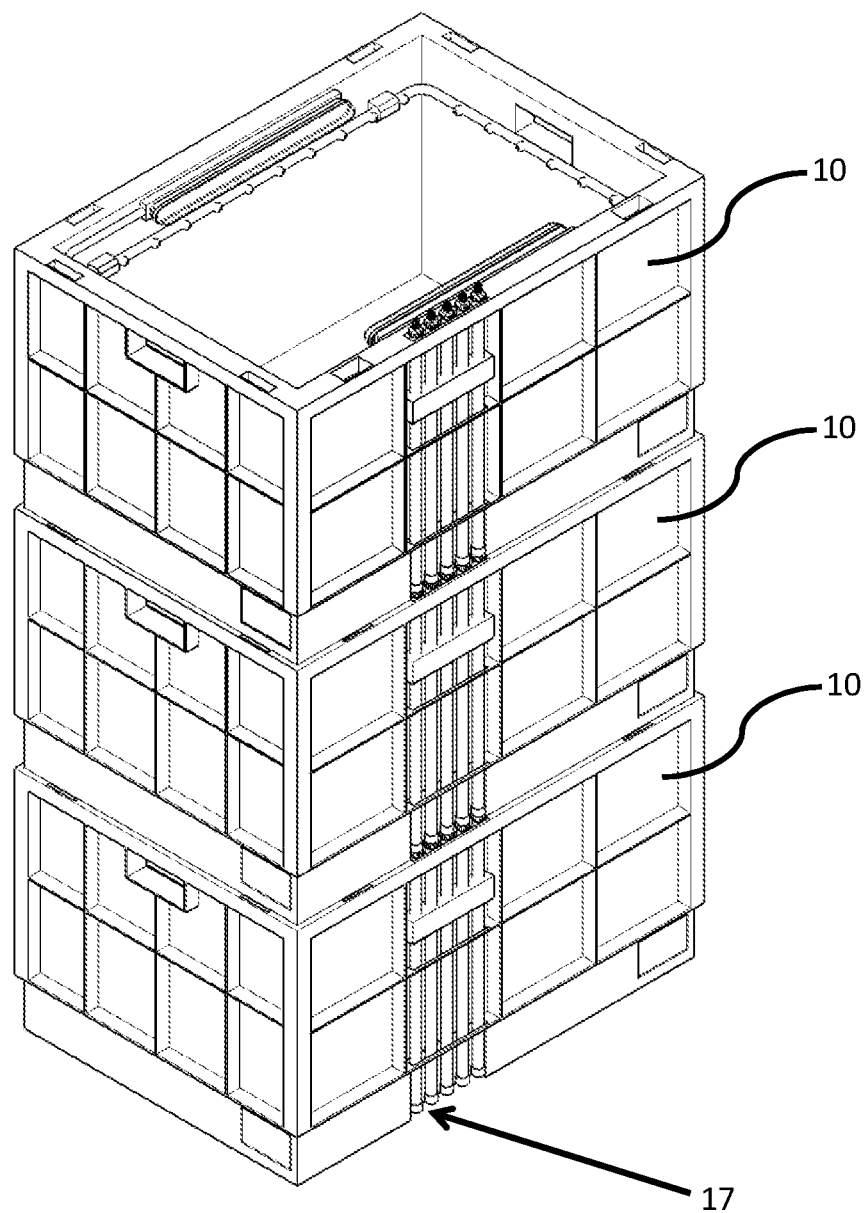
FIG. 9 is a schematic perspective view of a stack of the containers of FIGS. 6a and 6b showing the connectors on the containers cooperating when the containers are stacked in a stack.

FIG. 9 shows a stack 12 of bins or containers 10 shown in FIGS. 8a-8c. The bins or containers 10 comprise fluid supply means and lighting means 60. The connectors 40 and 17 cooperate together to connect each bin or container 10 the bin or container 10 immediately above and below. In this way, services such as power, to power the lighting means 60 or water to irrigate the contents of an individual container 10 may be routed through the containers in the stacks 12.

Figure 10:
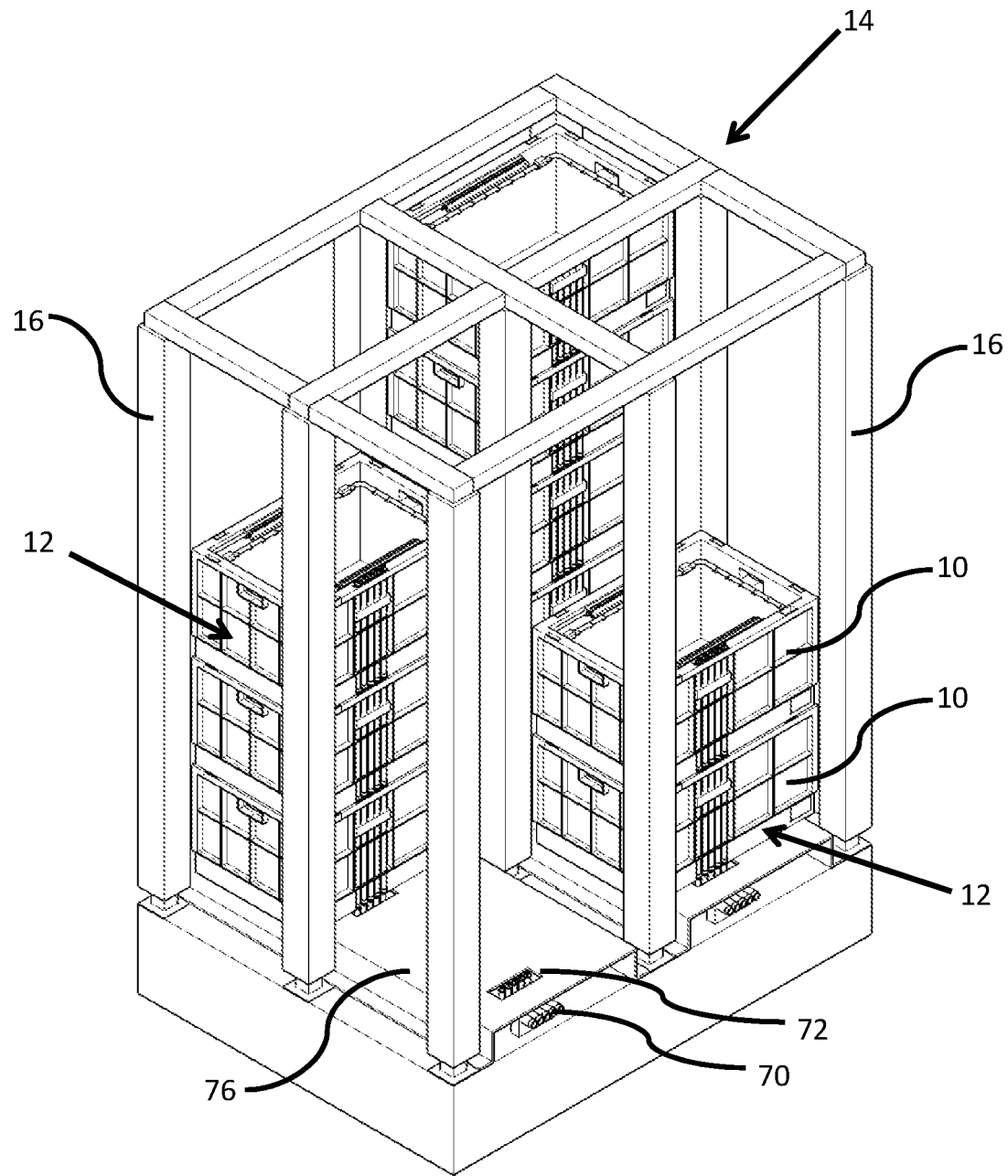
FIG. 10 is a schematic perspective view of the stack of containers of FIG. 9, the containers being located within a framework of one form of a storage and retrieval system, the connectors further connecting to supply means located in the base of the storage and retrieval system.

FIG. 10 shows a portion of the framework 14 of the storage system comprising a plurality of bins or containers 10 located therein, the bins or containers 10 carrying services upwardly through the framework 14 of the system by wires, cables or pipes or any other suitable means 17. As can be seen in more detail in FIG. 10, the bottom bin or container 10 in the stack 12 connects to supply means routed through the base of the storage system via connectors 72. It will be appreciated that the supply means in the base may be located in a false base 76 of the system as shown in FIG. 10 but may otherwise be routed under the floor of the building comprising the storage system or may be routed via other means.

Figure 11:
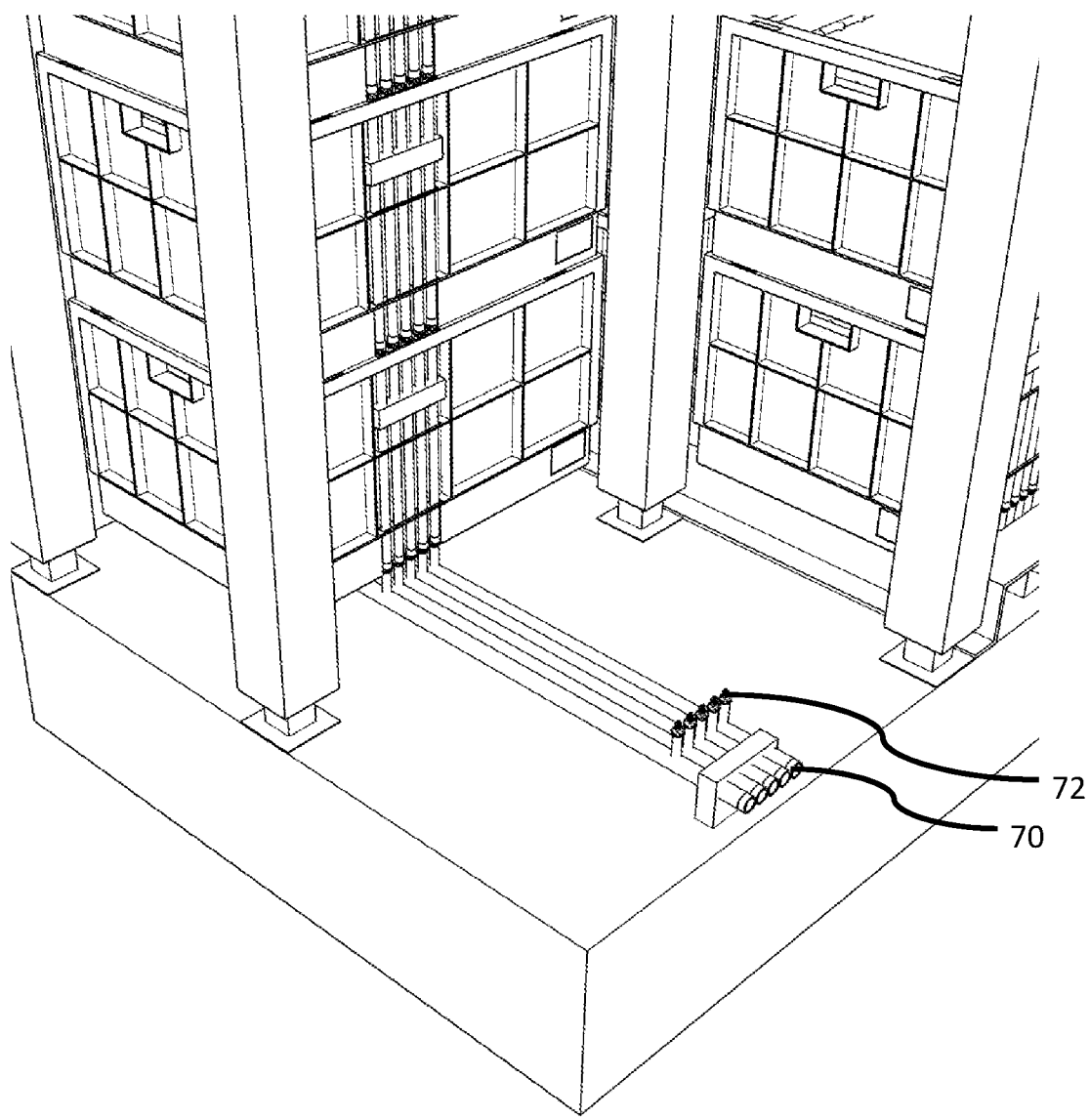
FIG. 11 is a schematic perspective view of the connections between the base of the storage and retrieval system and the bottom container within a stack.

FIG. 11 shows the connection means between a stack 12 of bins or containers 10 and the supply means in the base 76 of the system in more detail. It will be appreciated that this is one example only of a suitable connection means and that any connector system of releasably connecting bins or containers 10 to power, data, electrical, lighting, telecommunications or any other supply or service may be envisaged.

Figure 12:
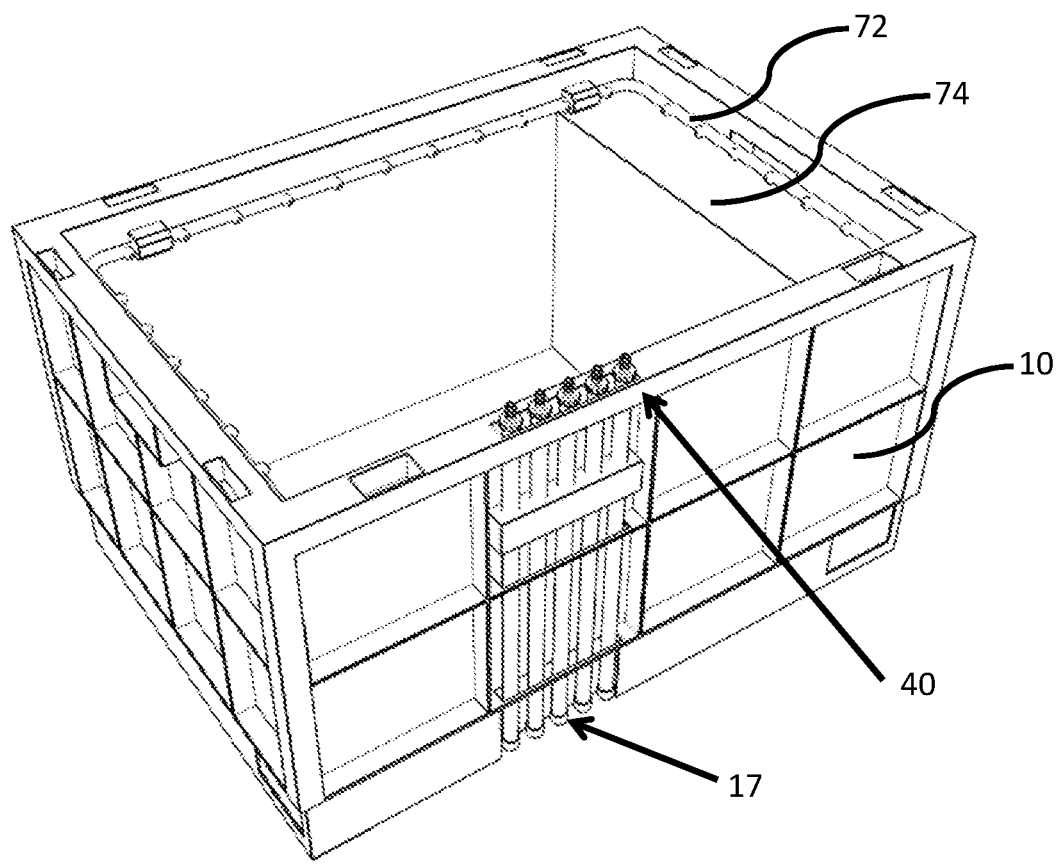
FIG. 12 is a schematic perspective view of a container, the container comprising fluid supply means and further comprising a fluid reservoir.

FIG. 12 shows yet another form of individual bin or container 10 in accordance with the invention from a stack 12, the bin or container 10 comprising fluid supply means 72 and further comprising a fluid reservoir 74. The contents of the bin or container 10 may require water to be supplied thereto. Accordingly, the bin or container 10 is provided with a reservoir 54 that may be filled with a liquid or gas. In order to fill the reservoir 74, the bin or container 10 may be removed from the stack 12 by the robotic load handling device and taken to a location in the system where the reservoir can be topped up as required. Alternatively, the required fluids may be routed to specific containers 10 via the uprights 16 of the grid system.

Figure 13:
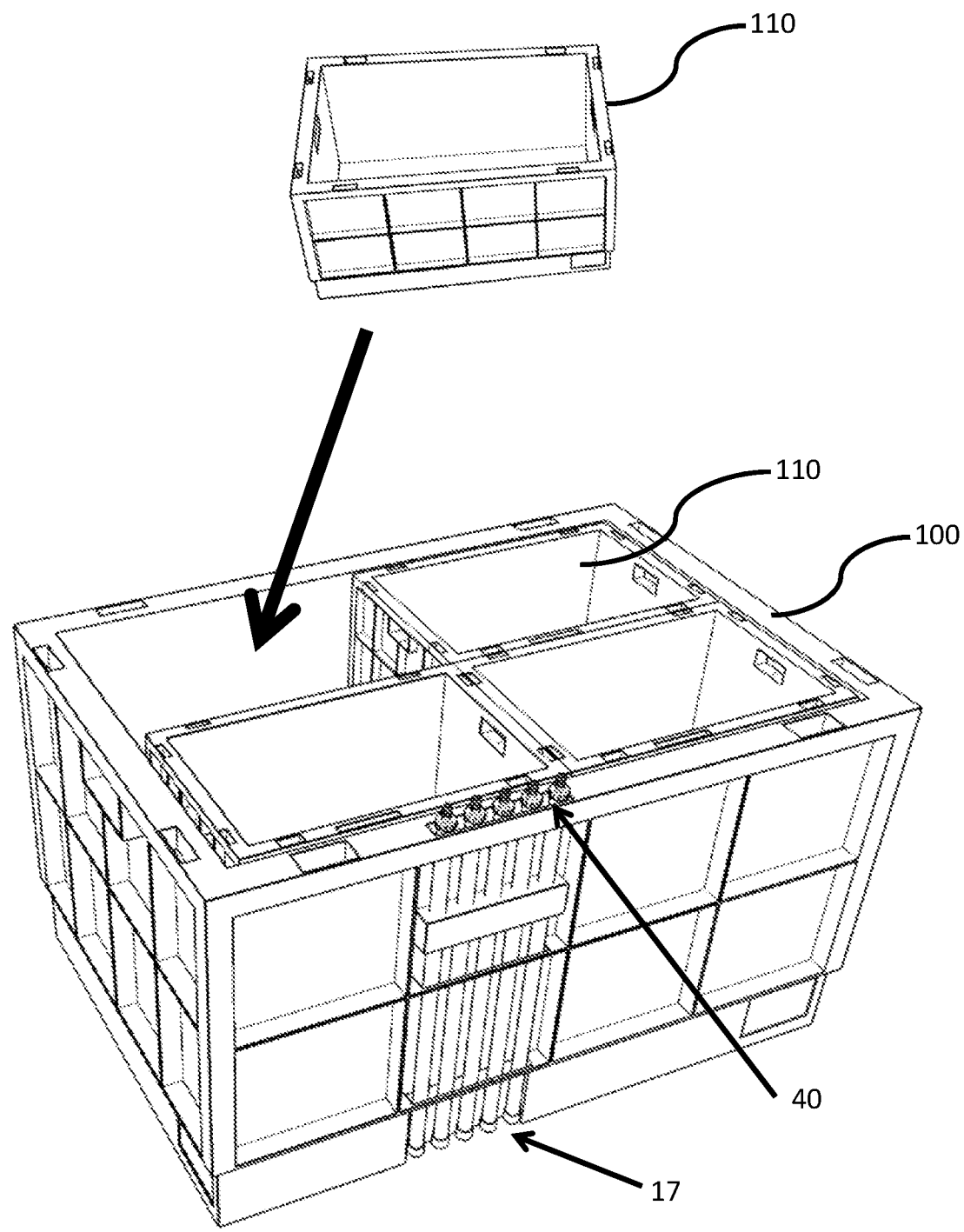
FIG. 13 is a schematic perspective view of a container comprising a plurality of smaller containers, each of the smaller containers comprising a given service connectable via the connection means located on at least one side of the container.

FIG. 13 shows a further embodiment of the invention in which a bin or container 100 comprises a plurality of smaller bins or containers 110, each of the smaller bins or containers 110 comprising a given service connectable via the connection means 17, 40 located on at least one side of the bin or container 10.

In use, the storage system described above with reference to the Figures, comprises a large number of bins or containers 10 arranged in stacks 12. In one example, the storage system comprises bins or containers 10 of different categories dispersed within the system. For example, there may be empty bins or containers 10, bins or containers 10 containing goods to be stored, bins or containers containing services such as power supplies or communications means or data transfer means or data storage means, bins or containers 10 capable of heating, bins or containers 10 capable of cooling, bins or containers 10 comprising goods requiring liquids and/or light. It will be appreciated that some or all of the bins or containers 10 may contain one or more of the services or devices referred to above. For example a bin or container 10 with a reservoir 54 may also be provided with lighting means 60.

The provision of data logging and condition monitoring means in bins or containers 10 within the stacks 12, enables a map of the condition and topography of the system to be generated that would not otherwise be possible unless specific bins or containers 10 were removed and examined. Furthermore, inclusion of camera means within a number of bins or containers 10 allows for containers to be moved around the system to inspect the condition of the grid and or other bins or containers 10.

Furthermore, providing services to specific individual bins or containers 10 either via the uprights 16 or via bin-to-bin contacts, enables goods having different requirements to be stored within the same storage system without resorting to portioning the system and separating goods with different requirements in to separate sections of the grid.

Additionally, connections between bins or containers 10 and communications between containers 10 and stacks 12 generates a knowledge base of the storage system in real time that will assist in the event of a power outage for example, that will aid in possible disaster recovery. The alternative would be to empty all the containers and rebuild the stack which would be inefficient and costly.

The system described above has many varied uses. The foregoing description provides details of specific controlling and monitoring services that may be used in some of the following circumstances. Some non-limiting examples, in accordance with aspects of the invention, of applications for smart bin or container 10 systems may include, but are not limited to the following:

A bin or container 10 comprising temperature sensing means may be used to monitor the temperature in chilled, frozen or ambient sections of the storage system. For example, an increase in the temperature in an ambient portion of the system could result in chocolate melting or ignitables igniting. This may be a particular problem in the summer months in warmer climates.

A bin or container 10 comprising camera means may be used to monitor the condition of the grid and other bins or containers 10 in the stacks 12. The robotic load handling devices 30 may be used to move the bins or containers 10 around the storage system to inspect portions of the system or other bins or containers 10 or stacks 12 as required. This may be relevant if there have been spillages in the system or other issues with the integrity of the system, grid or bins or containers.

A bin or container 10 identification means within each individual container 10 together with communications means between bins or containers 10 or stacks 12 may be used to create a topological profile of the storage system, where peer-to-peer identity is possible. In the event of a catastrophic failure of the systems controlling the stacks, the topological information may be used to create a disaster recovery situation.

Individual bins or containers 10 may be provided with lighting means 60, for use in conjunction with monitoring and camera means in order to assist in inspection of individual bins or containers 10 or the system as a whole. Furthermore, contents of the bins or containers 10 may benefit from lighting of specific wavelengths or a range of wavelengths. For example, under ripe fruit may be brought on using appropriate lighting. Additionally, it may be possible to use bins or containers 10 for cultivation purposes.

The storage bins or containers 10 may be provided with sensors to detect gas, smoke, fire or heat, the sensors activating sprinkler systems to put out any fire.

Should the storage system be used, for example, to store cars in a mechanised car park, as described in UK patent publication number GB2540838, the contents of which is incorporated herein by reference, sensors detecting fire or smoke may activate sprinklers and communication means may be provided to directly communicate with a central monitoring system or directly to the emergency services.

A bin or container 10 comprising gas sensing means may be used to monitor the condition of fruit in a chilled portion of the system. Ripening fruit give off gases so monitoring for these specific gases may provide an indication of over ripening fruit in storage. Should this be detected, containers 10, having cooling means within the bin may be cooled to prevent over ripening of the contents.

Should the bins or containers 10 be used for storing alternative goods such as parcels, the bins or containers 10 may contain weighing means such as scales to monitor the weight of parcels in storage before onward distribution.

It will be apparent from the preceding description that all the bins or containers 10 comprising services of some form will require power, data or signal connections to be carried to the services or devices within the bin or container 10. As described above, electrical connections 40 between bins or containers 10 or between the bottommost bin or container 10 of a stack may be of any suitable form, such as interference connections or any other suitable releasable connector capable of carrying the required power, data or signal between bins or containers 10 or a bin or container 10 and the base of the system or an upright within the system.

In one embodiment of the invention, the bins or containers 10 comprise intelligence means such as routers, calculators or servers (not shown). The intelligence means may communicate via peer to peer communications across the bins or containers 10 in the system. Furthermore, the communications may occur via contactless light through air communications, however any other suitable means for communication between the containers 10 may be envisaged and used.

The intelligence means may be powered and controlled by suitable power supply means and power control means such as those means described above.

Utilising the proximity of the bins or containers 10 provides a system having relatively short communication distances between the intelligence means located in the bins or containers 10. The relatively short distances reduce latency between the intelligence means, the system being capable of fast and powerful operation.

Such a system may require extensive cooling. Such cooling means may be provided as described above or via cooling means being passed up the uprights 16 of the framework 14 from the base of the system.

Should a bin or container 10 require removal from a stack 12 within the framework 14, it will be appreciated that loss of data, signal, power etc could occur when the bin or container 10 is removed from the top of the stack 12, from within the stack 12 or from the bottom of the stack 12. This is simply because as described above, the bins or containers 10 take their power from the base of the stack 12 and from under the storage system via the connectors 70 in the base and the connectors 40 within the stacks 12. Bins or containers 10 may require removal from the stacks 12 for repair reasons, redistribution reasons and to enable the systems or services within a given bin or container 10 to be changed and for many other reasons.

In order to facilitate movement of the bins or containers 10 around the storage system or to enable removal of any given bin or container 10 completely, it may be necessary to provide power, data, signal or any other services to the individual bin or container 10 when it is in the process of removal or movement and hence disconnection from any service provided via the framework 14 or from the base of the storage system as described above.

Figure 14:
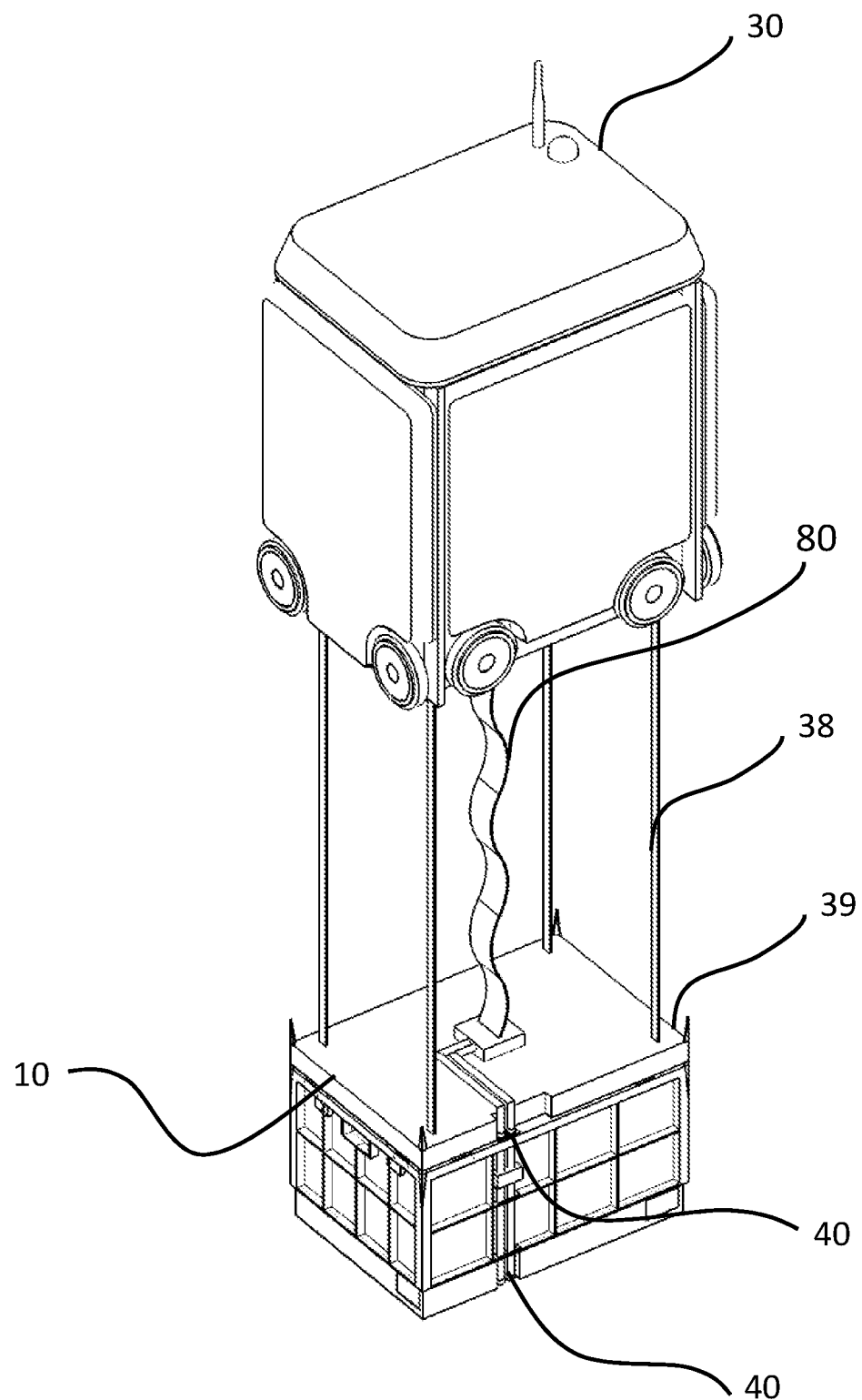
FIG. 14 is a schematic perspective view of a load handling device in accordance with one form of the invention, the load handling device comprising lifting means, the lifting means further comprising releasable connecting means, the connecting means comprising means for electrically connecting the container to a power supply located in or on the load handling device.

As shown in FIG. 14, in accordance with one form of the invention, the load handling device 30 comprising lifting means 39, the lifting means 39 further comprising releasable connecting means 40, the connecting means 40 comprising means for electrically or otherwise connecting the bin or container 10 to a power supply or other service (not shown) located in or on the load handling device 30.

Figure 15:
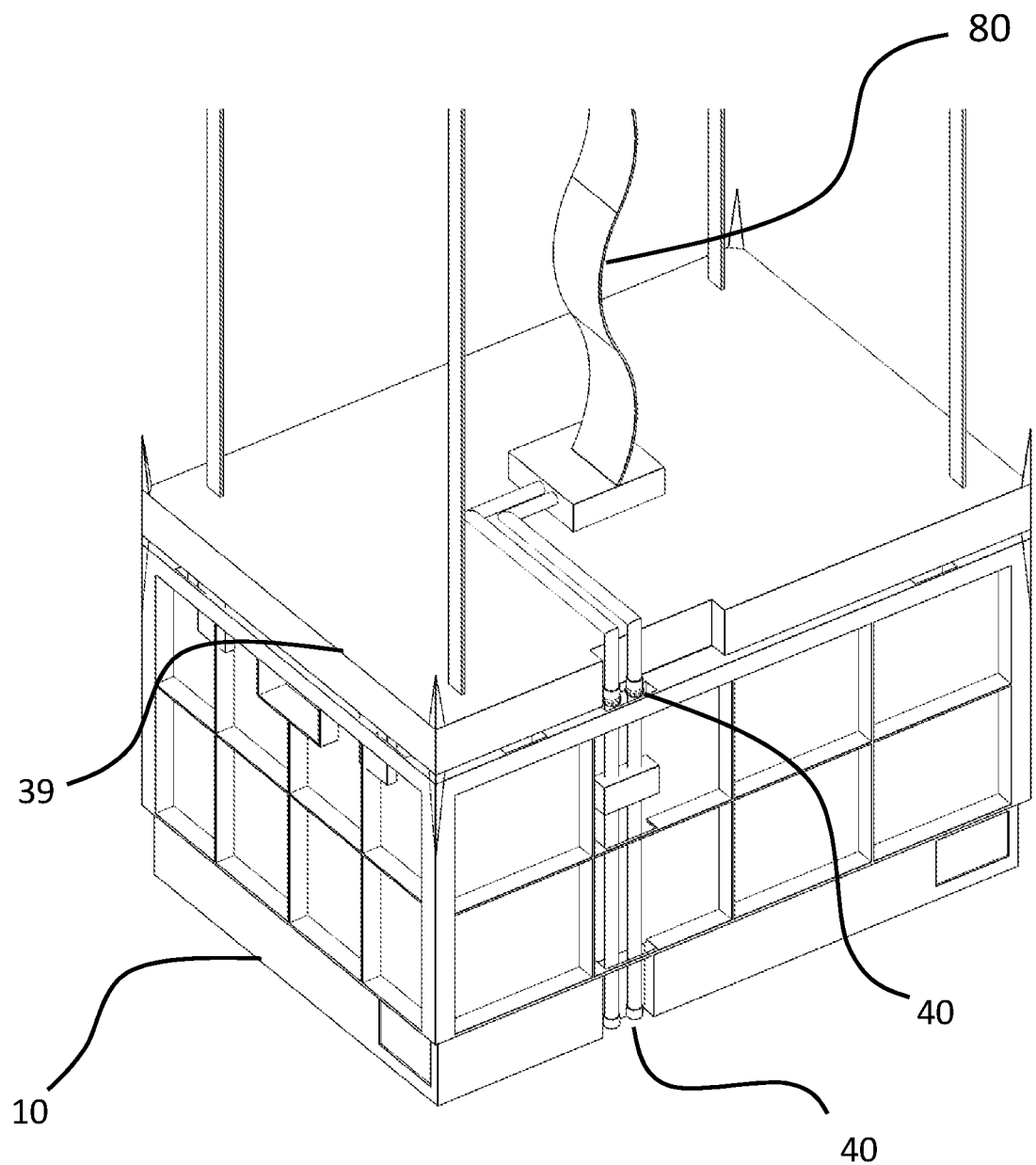
FIG. 15 is an expanded schematic perspective view of the lifting means of FIG. 14 showing in more detail, one form of electrically connecting means for electrically connecting the container to the load handling device.

The lifting device 39 of the load handling device 30 is provided with cable 80 and connection means 40 suitable for releasably connecting to the bin or container 10. The cable 80 performs the function of an umbilical, connecting a power, data or signal source in the load handling device 30 via the releasable connecting means 40 to the container 10. FIGS. 14 and 15 show one form that the connections may take. However, it will be appreciated that any form of suitable connector 40 may be used capable of carrying power or signals or services as appropriate. The cable 80 may be any suitable form of cable capable of carrying the services required. Furthermore, it will be appreciated that the cable 80 may perform multiple functions, for example connecting a power source to the bin or container 10 and carrying data signals to a data storage device carried within the load handling device.

Furthermore, the load handling device 30 may be utilised a means for downloading data from a bin or container 10 without removing the bin or container 10 from the system.

FIG. 15 is an expanded schematic perspective view of the lifting means of FIG. 14 showing in more detail, one form of electrically connecting means 40 for electrically connecting the container to the load handling device 30.

In this way a make before break system is provided to enable removal of bins or containers 10 from stacks 12 within the system.

FIGS. 16 to 18 demonstrate the use of the make before break connection system. FIG. 16 shows a portion of the storage system showing a number of stackable bins or containers 10 in situation within the uprights 14 of the storage system, each of the bins or containers 10 being at least electrically connected to the bin or container 10 immediately above and or below as appropriate, the bins or containers 10 at the bottom of each stack 12 being electrically connected to a power source (not shown) located within the storage system, said connections between bins or containers 10 or between bins or containers 10 and the base of the system being releasable when the lifting device 39 of the load handling device 30 is connected. It is important to note that the lifting device 39 will connect to the bin or container 10 and establish a connection between the load handling device 30 power source and the bin or container 10 before the bin or container 10 is disconnected from the bin or container 10 to which it is electrically connect beneath.

In use, the connection between the bin or container 10 to be removed and the load handling device 30 will be verified before the bin or container 10 is moved from the stack 12. This verification may be conducted by monitoring load on the load handling device 30 power supply for example or by any other suitable means.

FIG. 17 shows the lifting device 39 being positioned and connected to the top most bin or container 10 of one of the stacks 12 of bins or containers 10 within the storage system, power and/or data and/or signal connections being provided to the load handling device 30 via a daisy-chain like cable 80. As described above it will be appreciated that the cable 80 may take any suitable form and need not be limited to the form of cable 80 shown in the diagrams. It is sufficient for any suitable form of cable 80 to be used capable of carrying the power, data or signals required between the load handling device 30 and the bin or container 10. In use, the load handling device 30 is positioned above a bin or container 10 to be removed. The lifting device 39 is lowered via suitable motor and tape means 38 down from the load handling device 30. The lifting device 39 releasably engages with the target bin or container 10. Once the connection between the bin or container 10 and the load handling device 30 is established, the bin or container 10 is lifted in to the load handling device 30.

It will be appreciated that if the bin or container 10 is connected mechanically to the bin or container 10 immediately beneath in the stack 12, some form of interlock release signal may be required to separate the mechanical connections. In the example above, where the electrical connections between the bins or containers 10 are interference or friction connections only, it will be sufficient for the lifting device 39 of the load handling device 30 to disconnect the bins or containers 10 from each other by force alone. However, other automatically triggered disconnection means may be required.

FIG. 18 shows a lifting device 39 in accordance with one form of the invention, lifting a bin or container 10 from the stack 12 of bins or containers 10, the bin or container 10 being lifted, being electrically connected to the load handling device 30 via a suitable cable 80 as described above.

In use, each bin or container 10 comprising the intelligence means, calculator or server may be connected with at least its six neighbours via optical channels. For example, using slightly transparent mirrors, each calculator could transmit or receive into this channel without disturbing any other traffic, for example, using wavelength division multiplexing. In this way, each node could have a speed of light, exactly defined latency, connection to every other node in the system.

For example, such communications means may comprise laser based transmission through air. However, other communication means may be provided, for example connection of the servers or calculators by fibre optic tentacles extending to make contact with neighbours.

For example for 100,000 containers 10, each comprising powerful intelligence means, may be combined in to a machine in a stack 60×60 and 28 tall in a 14 k sq ft space. Or 1 million containers in a 200×160 grid, 33 tall in a 125 k sq ft building.

It will be appreciated that there are numerous applications that may benefit from this instantaneous and defined node to node connectivity. For example, flow simulations and the like for aircraft design, weather forecasting or climate models, financial trading calculations, protein synthesis calculation and simulations of chemical reactions with whole organisms may advantageously benefit from such large, densely packed intelligence means. However, it will be appreciated that these examples are given for example only and are not limiting.

It will further be appreciated that individual bins or containers 10 may be provided with one service, a selection of services or all services described. Furthermore, the services listed should not be regarded as limiting. Any form of service that is capable of being carried or transmitted to a bin or container 10 may be envisaged.

Furthermore, although the embodiments of the invention described above, and shown in the Figures, detail systems in which the bins or containers 10 are all of a substantially identical size and shape, it will be appreciated that this need not be the case. As described in UK Patent Publication No. GB 2528573 claiming priority from UK Patent Application No 1506364.7 filed 15 Apr. 2015, incorporated herein by reference, it will be appreciated that such a system may be configured to handle bins or containers 10 of multiple sizes by use of load handling devices 30 of differing sizes capable of lifting and moving containers 10 of multiple sizes.

Moreover, the embodiments described above and detailed in the accompanying Figures assume that the storage system comprises bins or containers 10 in stacks 12 disposed within a framework 14 in an unfettered manner. It will be appreciated that the system may be partitioned by suitable partitioning means into smaller sub sections defined by, for example temperature. In this way it would be possible to have an ambient portion, a chilled portion and a frozen portion for example. It will also be appreciated that the partitioning may have additional advantages, for example, partitioning enables sections of the storage system to be isolated from other sections. This may be necessary if there is a fire, for example, and fire suppressant means are used in a given area to extinguish the fire. Furthermore, in the case where the system is used for alternative uses, there may be advantages in having different gaseous atmospheres in different portions of the system. This may be achieved by partitioning the system. It will be appreciated that the partitioning means may be temporary and remotely deployable, for example roller shutters disposed under the grid.

It will be appreciated in the foregoing examples that the load handling device 30 carries sufficient power or other resources to maintain the power, data, signal or other services required by the bin or container 10 to be removed from the fixed supplies provided through the framework 14 of the system.

However, it will be appreciated that the load handling device 30 may not have sufficient of the services required. In this case, in order to maintain services such as power, data, cooling and any other service required by the removed bin or container 10, the load handling device 30 may be provided with such required services via alternative means. These means may include but not be limited to for example an overhead umbilical connected to the load handling device and transported around the system by virtue of the connection to the load handling device capable of carrying the required services to the load handling device for connection to the bin or container 10 to be removed. Alternatively, overhead sockets may be provided located above the storage system that the load handling device can releasably attach to such that such services are transmitted via the load handling device 30 to the bin or container 10 to be removed.

Furthermore, it will be appreciated that the load handling device 30 may be provided with means for connection to a service being provided via the framework 14 or to an uppermost bin or container 10 in an adjacent stack 12. In this way the required service is provided through the components of the storage system available in close proximity to the load handling device 30 at the pint when a bin or container 10 is to be removed from a stack 12.

Moreover, it will be appreciated that additional load handling devices 30 operative on the system may form a cluster adjacent the load handling device 30 lifting the target bin or container 10 to then provide required services to the load handling device 30 that is holding the stack 12 of bins or containers 10 requiring the services.

It will be appreciated from the foregoing that the or each load handling device may be configured to connect to, lift and remove one bin or container 10 from a stack 12. However, it will be appreciated that a load handling device 30 may be configured to connect to, lift and remove more than one bin or container 10 in a single movement.

It will be appreciated that the embodiments described above that the term bins or containers 10 is used to denote storage containers 10 stackable in stacks 12 within a storage system. However, the storage bins or containers 10 may comprise further containing means within the bin or container 10 structure. The containing means may be connected to the bin or container by any suitable means to allow transfer of power, signal or data between the containing means, the bin or container 10 and the load handling device 30. This may be particularly the case should the bin or container be required to carry intelligence or calculating means and require cooling.

Many variations and modifications not explicitly described above are also possible without departing from the scope of the invention as defined in the appended claims.

The invention claimed is:

1. A storage system comprising:
a first set of parallel rails or tracks and a second set of parallel rails or tracks extending transverse to the first set in a substantially horizontal plane to form a grid pattern comprising a plurality of grid spaces;

a plurality of stackable storage containers arranged in stacks, the stacks of storage containers being located beneath the rails or tracks, each stack being located within the footprint of a grid space; and a load handling device arranged to move laterally on the rails or tracks above the stacks of storage containers, the load handling device including a lifting device arranged to lift one or more storage containers of the plurality of storage containers, or parts thereof, from a top of a stack, wherein the lifting device includes a cable to provide a service from a service source in the load handling device to the one or more storage containers, to be lifted by the load handling device, in use, from the top of the stack.

2. A storage system according to claim 1, wherein the lifting device comprises a releasable connector adapted to connect the one or more storage containers to be lifted to the service provided from the service source in the load handling device, via the cable.

3. A storage system according to claim 1, comprising:
an overhead connector connectable to the load handling device to carry the service to the load handling device for connection to the one or more storage containers to be lifted.

4. A storage system according to claim 1, comprising:
overhead sockets for the load handling device to releasably attach to, such that the service is transmittable, via the load handling device, to the one or more storage containers to be lifted.

5. A storage system according to claim 1, wherein the load handling device is provided with a connector to an alternative service supply, the alternative service supply forming part of the storage system.

6. A storage system according to claim 5, wherein the alternative service supply is provided by an uppermost storage container in an adjacent stack to the stack from which the one or more storage containers are to be lifted.

7. A storage system according to claim 1, comprising:
further load handling devices arranged to:
move laterally on the rails or tracks above the stacks of storage containers;
form a cluster adjacent the load handling device arranged to lift the one or more storage containers; and
provide the service to the load handling device when the one or more storage containers are lifted, in use, from the top of the stack.

8. A storage system according to claim 1, wherein the service comprises at least one of power, data, signal, nutrients, water, fluid, gas, radiation, lighting, heating, cooling, or other services.

9. A storage system according to claim 1, wherein each storage container of the plurality of storage containers arranged in the one or more stacks comprises:
a first connector adapted to connect to the lifting device to receive the service from the service source in the load handling device; and
a second connector adapted to connect to the first connector of a storage container below in a given stack of the one or more stacks such, that the service is routable through the storage containers in the given stack.

10. A storage system according to claim 9, wherein the second connector of each storage container is adapted to connect to a primary service source at a base of the given stack in the storage system, the service source in the load handling device being a secondary service source.

11. A storage system according to claim 1, wherein the cable is configured to provide multiple services, from multiple corresponding service sources in the load handling device, to the one or more storage containers to be lifted.

12. A method of providing a service to a storage container in a storage system including a first set of parallel rails or tracks and a second set of parallel rails or tracks extending transverse to the first set in a substantially horizontal plane to form a grid pattern including a plurality of grid spaces, a plurality of the storage containers arranged in stacks, the stacks of storage containers being located beneath the rails or tracks, each stack being located within the footprint of a grid space, and a load handling device arranged to move laterally on the rails or tracks above the stacks of storage containers, the load handling device including a lifting device arranged to lift a storage container of the plurality of storage containers, or parts thereof, from the top of a given stack, wherein the method comprising:
providing the lifting device with a cable to provide the service from a service source in the load handling device to the storage container;
positioning the load handling device above the one or more storage containers to be lifted from the given stack;
lowering the lifting device from the load handling device;
releasably connecting the lifting device to the storage container;
supplying the service to the storage container, from the service source in the load handling device, via the cable; and
lifting the storage container from the given stack while the service is supplied via the cable.

13. A method according to claim 12, comprising:
connecting an overhead connector to the load handling device to carry the service to the load handling device to the storage container to be lifted.

14. A method according to claim 12, comprising:
releasably attaching the load handling device to overhead sockets, such that the service is transmittable, via the load handling device, to the storage container to be lifted.

15. A method according to claim 12, comprising:
connecting the load handling device to an alternative service supply forming part of the storage system.

16. A method according to claim 15, wherein the alternative service supply is provided by an uppermost storage container in an adjacent stack to the stack from which the storage container is to be lifted.

17. A method according to claim 12, further comprising:
moving further load handling devices on the rails or tracks to form a cluster adjacent the load handling device arranged to lift the storage container to be lifted; and
providing the service to the load handling device when the storage container is lifted, in use, from the top of the stack.

18. A method according to claim 12, wherein the service comprises at least one of power, data, signal, nutrients, water, fluid, gas, radiation, lighting, heating, cooling, or other services.

19. A method according to claim 12, comprising:
supplying multiple services, from multiple corresponding service sources in the load handling device, to the storage container to be lifted via the cable.

* * * * *